(12) United States Patent
Aleksic et al.

(10) Patent No.: US 8,700,393 B2
(45) Date of Patent: *Apr. 15, 2014

(54) MULTI-STAGE SPEAKER ADAPTATION

(71) Applicant: Google Inc., Mountain View, CA (US)

(72) Inventors: Petar Aleksic, Mountain View, CA (US);
Xin Lei, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/035,499

(22) Filed: Sep. 24, 2013

(65) Prior Publication Data

US 2014/0025378 A1   Jan. 23, 2014

Related U.S. Application Data

(63) Continuation of application No. 13/653,792, filed on Oct. 17, 2012, now Pat. No. 8,571,859.

(60) Provisional application No. 61/653,680, filed on May 31, 2012.

(51) Int. Cl.
*G10L 15/00* (2013.01)

(52) U.S. Cl.
USPC .......................................... 704/231

(58) Field of Classification Search
USPC ................................. 704/231, 255
See application file for complete search history.

(56) References Cited

U.S. PATENT DOCUMENTS

| | | | |
|---|---|---|---|
| 5,864,810 A * | 1/1999 | Digalakis et al. | 704/255 |
| 5,895,447 A * | 4/1999 | Ittycheriah et al. | 704/231 |
| 6,236,963 B1 * | 5/2001 | Naito et al. | 704/241 |
| 6,418,411 B1 * | 7/2002 | Gong | 704/256.5 |
| 6,567,776 B1 * | 5/2003 | Chang et al. | 704/236 |
| 6,804,647 B1 * | 10/2004 | Heck et al. | 704/246 |
| 7,668,718 B2 * | 2/2010 | Kahn et al. | 704/270 |
| 2010/0169094 A1 * | 7/2010 | Akamine et al. | 704/244 |

* cited by examiner

*Primary Examiner* — Michael N Opsasnick
(74) *Attorney, Agent, or Firm* — McDonnell Boehnen Hulbert & Berghoff LLP

(57) ABSTRACT

A first gender-specific speaker adaptation technique may be selected based on characteristics of a first set of feature vectors that correspond to a first unit of input speech. The first set of feature vectors may be configured for use in automatic speech recognition (ASR) of the first unit of input speech. A second set of feature vectors, which correspond to a second unit of input speech, may be modified based on the first gender-specific speaker adaptation technique. The modified second set of feature vectors may be configured for use in ASR of the second unit of input speech. A first speaker-dependent speaker adaptation technique may be selected based on characteristics of the second set of feature vectors. A third set of feature vectors, which correspond to a third unit of speech, may be modified based on the first speaker-dependent speaker adaptation technique.

20 Claims, 12 Drawing Sheets

US 8,700,393 B2

MULTI-STAGE SPEAKER ADAPTATION

CROSS-REFERENCE TO RELATED APPLICATIONS

This application claims priority to U.S. Pat. No. 8,571,859, which, in turn, claims priority to provisional U.S. patent application Ser. No. 61/653,680, both of which are hereby incorporated by reference in their entirety.

BACKGROUND

Automatic speech recognition (ASR) technology can be used to map audio utterances to textual representations of those utterances. In some systems, ASR involves comparing characteristics of the audio utterances to an acoustic model of human voice. However, different speakers may exhibit different speech characteristics (e.g., pitch, accent, tempo, etc.). Consequently, the acoustic model may not perform well for all speakers.

SUMMARY

In a first example embodiment, a first gender-specific speaker adaptation technique may be selected based on characteristics of a first set of feature vectors. The first set of feature vectors may correspond to a first unit of input speech, and may be configured for use in automatic speech recognition (ASR) of the first unit of input speech. A second set of feature vectors may be modified based on the first gender-specific speaker adaptation technique. The second set of feature vectors may correspond to a second unit of input speech. The modified second set of feature vectors may be configured for use in ASR of the second unit of input speech. A first speaker-dependent speaker adaptation technique may be selected based on characteristics of the second set of feature vectors. A third set of feature vectors may be modified based on the first speaker-dependent speaker adaptation technique. The third set of feature vectors may correspond to a third unit of input speech. The modified third set of feature vectors may be configured for use in ASR of the third unit of input speech.

In a second example embodiment, a first set of feature vectors may be obtained. The first set of feature vectors may correspond to a first unit of input speech. Characteristics of the first set of feature vectors may be compared to a first gender-specific speech model and a second gender-specific speech model. The characteristics of the first set of feature vectors may be determined to fit the first gender-specific speech model better than the second gender-specific model. A second set of feature vectors may be obtained. The second set of feature vectors may correspond to a second unit of input speech. The second set of feature vectors may be modified based on a first gender-specific speaker adaptation technique associated with the first gender-specific speech model. After modifying the second set of feature vectors, characteristics of the second set of feature vectors may be compared to the first gender-specific speech model, the second gender-specific speech model, and a speaker-dependent speech model. The characteristics of the second set of feature vectors may be determined to fit the speaker-dependent speech model better than the first and second gender-specific models. A third set of feature vectors may be obtained. The third set of feature vectors may correspond to a third unit of input speech. The third set of feature vectors may be modified based on a speaker-dependent speaker adaptation technique associated with the speaker-dependent speech model.

A third example embodiment may include a non-transitory computer-readable storage medium, having stored thereon program instructions that, upon execution by a computing device, cause the computing device to perform operations in accordance with the first and/or second example embodiments.

A fourth example embodiment may include a computing device, comprising at least a processor and data storage. The data storage may contain program instructions that, upon execution by the processor, operate in accordance with the first and/or second example embodiments.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

1. Overview

Figure 1:
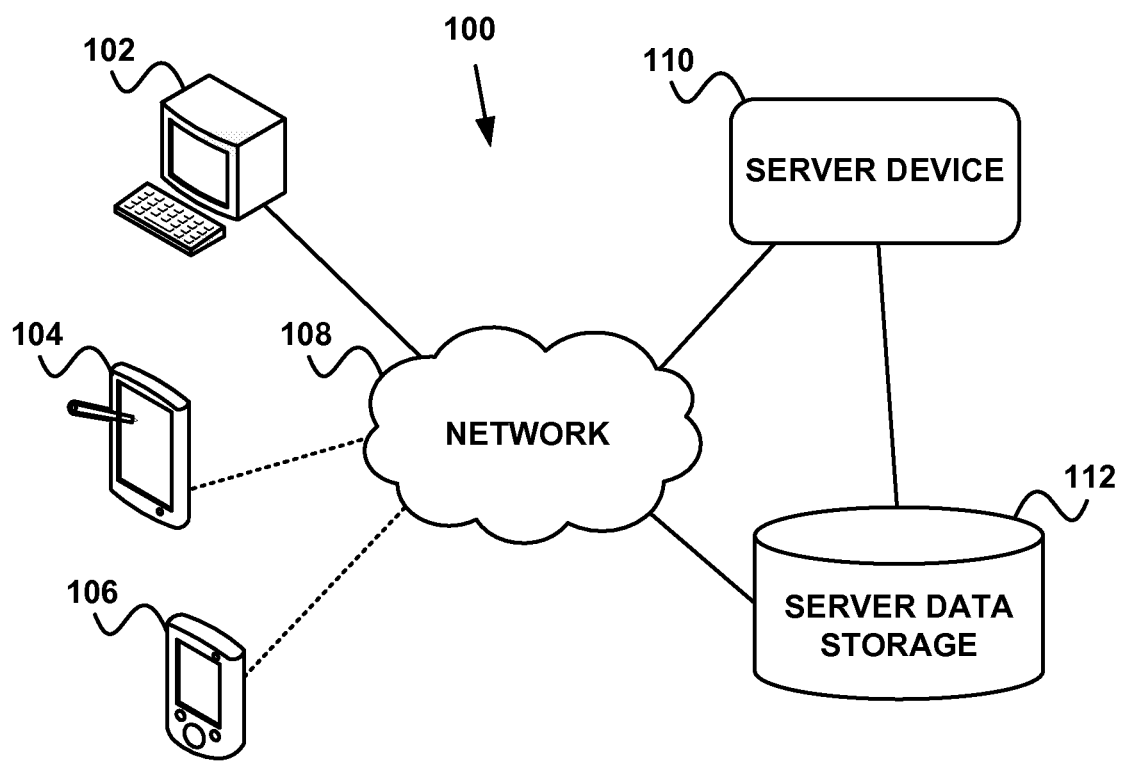
FIG. 1 depicts a distributed computing architecture, in accordance with an example embodiment.

ASR systems may include an acoustic model. The acoustic model may be speaker independent, in that it can represent the temporal and/or spectral characteristics of various sub-word sounds (e.g., phonemes) of a hypothetical "average" speaker. However, utterances from different speakers can have different qualities (e.g., different frequencies, tempos, accents, etc.). Thus, an acoustic model may perform reasonably well for most speakers, but may perform poorly when processing the utterances of some speakers—particularly, speakers whose voices exhibit temporal and/or spectral characteristics that have not been appropriately represented in the acoustic model.

Speaker-dependent acoustic models can also be developed. These acoustic models are tuned to the speech characteristics of a particular speaker. However, developing a speaker-dependent acoustic model may involve collecting a great deal of accurately-transcribed utterances of this particular speaker. Thus, despite the error rates of speaker-dependent acoustic models being lower than those of speaker-independent acoustic models, speaker-dependent acoustic models may not always be possible or practical to develop.

Speaker adaptation can also be used with acoustic models. At a high level, speaker adaptation may involve the ASR system determining (i) the temporal and/or spectral characteristics of a particular speaker's voice, (ii) the difference between these characteristics and associated characteristics of the acoustic model, and (iii) developing a transform that maps the temporal and/or spectral characteristics of the particular speaker's voice to a representation that is closer to that of the acoustic model. This transform may then be applied to subsequent utterances received from the speaker, and the acoustic model may be applied to the result. Developing the transform and applying it to map the speaker's vocal characteristics to an acoustic model can be referred to as feature-space speaker adaptation.

Additionally or alternatively, speaker adaptation may involve adjusting the acoustic model itself based on the characteristics of the particular speaker's voice. For instance, once the ASR system has processed a sufficiently large set of samples of the speaker's utterances using an initial acoustic model, a new acoustic model can be derived from these utterances. The new acoustic model may be used in place of the initial acoustic model. This approach can be referred to as model-space speaker adaptation. Typically, more samples of the speaker's utterances and more computing resources are used to perform model-space speaker adaptation than are used to perform feature-space speaker adaptation.

Given that speaker adaptation can be beneficial, improving the performance of speaker adaptation is desirable. Particularly, among other features, the embodiments herein disclose various aspects of multi-stage speaker adaptation.

An ASR system may receive a significant amount of speech input from a particular speaker (perhaps several seconds or more) before it can apply a speaker-dependent speaker adaptation technique. Herein, a speaker adaptation technique may refer to any mechanism for adapting input speech, and a specific speaker adaptation technique may be associated with one or more speaker adaptation profiles. These profiles, in turn, may define or be associated with parameters that are used for speaker adaptation.

In the time before the ASR system applies the speaker-dependent speaker adaptation technique, the ASR system may be processing the particular speaker's speech input without speaker adaptation. Therefore, during this period, the ASR system's speech recognition performance may be limited to that provided by a speaker-independent acoustic model.

However, it may be possible for the ASR system to apply an intermediate degree of speaker adaptation before performing speaker-dependent speaker adaptation. For instance, male and female voices tend to have distinct differences, such as different frequency ranges. Thus, rapidly identifying the gender of a speaker may be possible based on the spectral characteristics of a relatively small amount of speech. Once the speaker's gender is identified, the ASR system may apply a gender-specific speaker adaptation technique to input utterances until the speaker has been identified. Then, a speaker-dependent speaker adaptation technique for the identified speaker may be applied. In this way, the speech recognition accuracy of the ASR system may be improved, to some extent, before the speaker is identified.

Further, the ASR system may continue performing aspects of speaker adaptation after the speaker is identified and speaker-dependent speaker adaptation is being performed. For instance, the ASR system may have access to multiple speaker adaptation profiles for some speakers. Each profile may be associated with the speaker speaking in a particular environment or location. One possible environment-specific, speaker-dependent speaker adaptation profile might be based on the speaker speaking in a quiet location, with little background noise. Another possible environment-specific, speaker-dependent speaker adaptation profile might be based on the speaker speaking in an environment with a particular type of background noise, such as an office or a car. The ASR system may choose an environment-specific, speaker-dependent speaker adaptation profile for the speaker based on the characteristics of the input utterances (e.g., some combination of the speaker's voice and the background noise) and/or the speaker's current location.

In some environments, devices involved in ASR may be shared by two or more speakers. For example, two individuals may be using the ASR feature of a tablet computer for transcription purposes, and may be passing the tablet computer back and forth to one another as they take turns speaking into it. Or, several individuals may be conducting a video conference in which ASR occurs either to provide real-time transcriptions of utterances, and/or to provide a transcribed record of the conversation.

In these situations, the ASR system may change speaker-adaptation techniques in various ways. For instance the ASR system may begin with no speaker adaptation, and then determine that a male speaker is speaking. Possibly in response to making this determination, the ASR system may begin applying a male-specific speaker adaptation technique to the input speech. Perhaps a few second later, the ASR system may have gathered a sufficient amount of information from this speaker's utterances to identify the speaker. Consequently, the ASR system may begin applying a speaker-dependent speaker adaptation technique to the input speech.

Later, the ASR system may determine that a female speaker is speaking, and begin applying a female-specific speaker adaptation technique to the input speech. Once the ASR system has gathered a sufficient amount of information from this speaker's utterances to identify the speaker, the ASR system may begin applying a speaker-dependent speaker adaptation technique to the input speech. Other embodiments are possible as well.

ASR systems can be deployed in various environments. Some ASR systems are employed in a user device (e.g., a personal computer, tablet computer, or wireless communication device). A user speaks utterances into the device, and the ASR system in the device transcribes the utterances into one or more text strings. Other ASR systems are server-based. A user speaks an utterance into a client device, and the client device transmits the utterance (e.g., in an encoded form) to a server device. Then, the server device performs ASR on the utterance and transmits one or more text string mappings to the client device. Nonetheless, aspects of ASR systems may be distributed in various ways between client and server devices.

The above processes, and example embodiments thereof, will be described in detail in Sections 5 and 6. However, in order to further embody ASR system implementations, the next three sections describe, respectively, example computing systems and devices that may support ASR systems, an overview of ASR system components and functions, and an overview of ASR system operation.

2. Example Communication System and Device Architecture for Supporting Automatic Speech Recognition The methods, devices, and systems described herein can be implemented using client devices and/or so-called "cloud-based" server devices. Under various aspects of this paradigm, client devices, such as mobile phones, tablet computers, and/or desktop computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

Furthermore, the "server devices" described herein may not necessarily be associated with a client/server architecture, and therefore may also be referred to as "computing devices." Similarly, the "client devices" described herein also may not necessarily be associated with a client/server architecture, and therefore may be interchangeably referred to as "user devices." In some contexts, "client devices" may also be referred to as "computing devices."

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

A. Communication System

FIG. 1 is a simplified block diagram of a communication system 100, in which various embodiments described herein can be employed. Communication system 100 includes client devices 102, 104, and 106, which represent a desktop personal computer (PC), a tablet computer, and a mobile phone, respectively. Each of these client devices may be able to communicate with other devices via a network 108 through the use of wireline connections (designated by solid lines) and/or wireless connections (designated by dashed lines).

Network 108 may be, for example, the Internet, or some other form of public or private Internet Protocol (IP) network. Thus, client devices 102, 104, and 106 may communicate using packet-switching technologies. Nonetheless, network 108 may also incorporate at least some circuit-switching technologies, and client devices 102, 104, and 106 may communicate via circuit switching alternatively or in addition to packet switching.

A server device 110 may also communicate via network 108. Particularly, server device 110 may communicate with client devices 102, 104, and 106 according to one or more network protocols and/or application-level protocols to facilitate the use of network-based or cloud-based computing on these client devices. Server device 110 may include integrated data storage (e.g., memory, disk drives, etc.) and may also be able to access a separate server data storage 112. Communication between server device 110 and server data storage 112 may be direct, via network 108, or both direct and via network 108 as illustrated in FIG. 1. Server data storage 112 may store application data that is used to facilitate the operations of applications performed by client devices 102, 104, and 106 and server device 110.

Although only three client devices, one server device, and one server data storage are shown in FIG. 1, communication system 100 may include any number of each of these components. For instance, communication system 100 may comprise millions of client devices, thousands of server devices and/or thousands of server data storages. Furthermore, client devices may take on forms other than those in FIG. 1.

B. Server Device

Figure 2A:
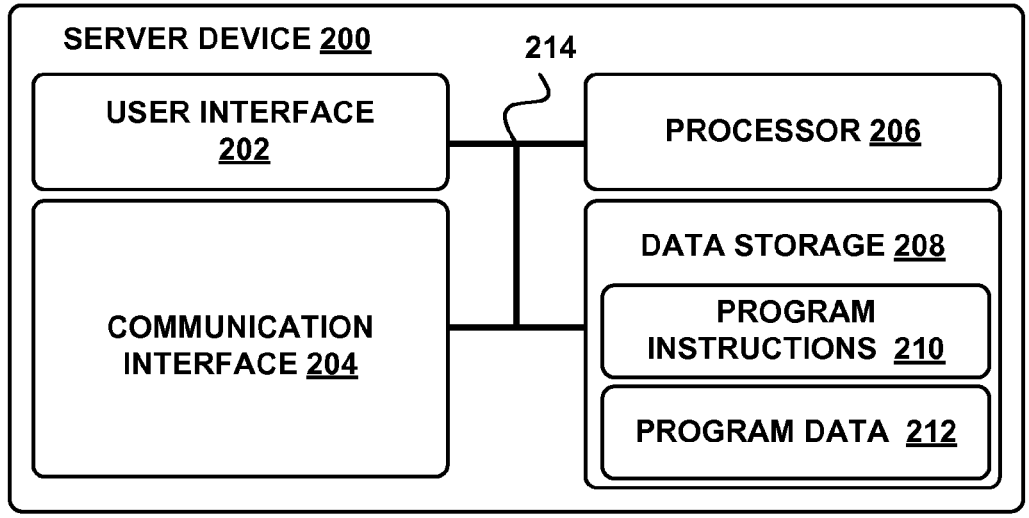
FIG. 2A is a block diagram of a server device, in accordance with an example embodiment.

FIG. 2A is a block diagram of a server device in accordance with an example embodiment. In particular, server device 200 shown in FIG. 2A can be configured to perform one or more functions of server device 110 and/or server data storage 112. Server device 200 may include a user interface 202, a communication interface 204, processor 206, and data storage 208, all of which may be linked together via a system bus, network, or other connection mechanism 214.

User interface 202 may comprise user input devices such as a keyboard, a keypad, a touch screen, a computer mouse, a trackball, a joystick, and/or other similar devices, now known or later developed. User interface 202 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 may be configured to generate audible output(s), via a speaker, speaker jack, audio output port, audio output device, earphones, and/or other similar devices, now known or later developed. In some embodiments, user interface 202 may include software, circuitry, or another form of logic that can transmit data to and/or receive data from external user input/output devices.

Communication interface 204 may include one or more wireless interfaces and/or wireline interfaces that are configurable to communicate via a network, such as network 108 shown in FIG. 1. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

Processor 206 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 may be configured to execute computer-readable program instructions 210 that are contained in data storage 208, and/or other instructions, to carry out various functions described herein.

Thus, data storage 208 may include one or more non-transitory computer-readable storage media that can be read or accessed by processor 206. The one or more computer-readable storage media may include volatile and/or non-volatile storage components, such as optical, magnetic, organic or other memory or disc storage, which can be integrated in whole or in part with processor 206. In some embodiments, data storage 208 may be implemented using a single physical device (e.g., one optical, magnetic, organic or other memory or disc storage unit), while in other embodiments, data storage 208 may be implemented using two or more physical devices.

Data storage 208 may also include program data 212 that can be used by processor 206 to carry out functions described herein. In some embodiments, data storage 208 may include, or have access to, additional data storage components or devices (e.g., cluster data storages described below).

C. Server Clusters

Server device 110 and server data storage device 112 may store applications and application data at one or more places accessible via network 108. These places may be data centers containing numerous servers and storage devices. The exact physical location, connectivity, and configuration of server device 110 and server data storage device 112 may be unknown and/or unimportant to client devices. Accordingly, server device 110 and server data storage device 112 may be referred to as "cloud-based" devices that are housed at various remote locations. One possible advantage of such "cloud-based" computing is to offload processing and data storage from client devices, thereby simplifying the design and requirements of these client devices.

In some embodiments, server device 110 and server data storage device 112 may be a single computing device residing in a single data center. In other embodiments, server device 110 and server data storage device 112 may include multiple computing devices in a data center, or even multiple computing devices in multiple data centers, where the data centers are located in diverse geographic locations. For example, FIG. 1 depicts each of server device 110 and server data storage device 112 potentially residing in a different physical location.

Figure 2B:
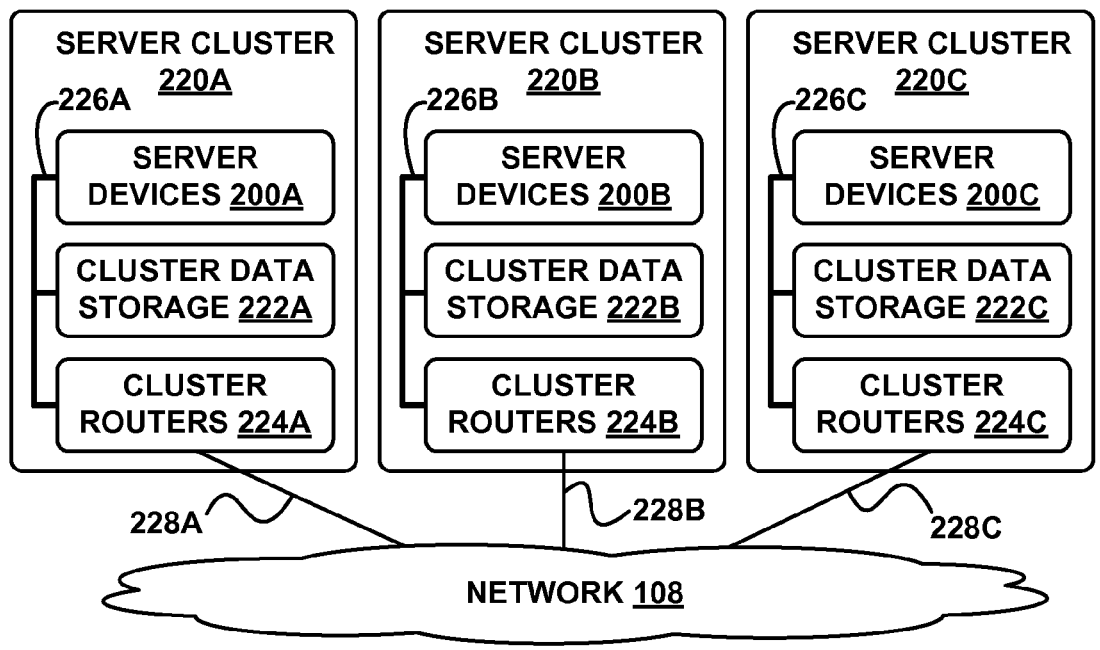
FIG. 2B depicts a cloud-based server system, in accordance with an example embodiment.

FIG. 2B depicts a cloud-based server cluster in accordance with an example embodiment. In FIG. 2B, functions of server device 110 and server data storage device 112 may be distributed among three server clusters 220A, 220B, and 220C. Server cluster 220A may include one or more server devices 200A, cluster data storage 222A, and cluster routers 224A connected by a local cluster network 226A. Similarly, server cluster 220B may include one or more server devices 200B, cluster data storage 222B, and cluster routers 224B connected by a local cluster network 226B. Likewise, server cluster 220C may include one or more server devices 200C, cluster data storage 222C, and cluster routers 224C connected by a local cluster network 226C. Server clusters 220A, 220B, and 220C may communicate with network 108 via communication links 228A, 228B, and 228C, respectively.

In some embodiments, each of the server clusters 220A, 220B, and 220C may have an equal number of server devices, an equal number of cluster data storages, and an equal number of cluster routers. In other embodiments, however, some or all of the server clusters 220A, 220B, and 220C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 220A, for example, server devices 200A can be configured to perform various computing tasks of server device 110. In one embodiment, these computing tasks can be distributed among one or more of server devices 200A. Server devices 200B and 200C in server clusters 220B and 220C may be configured the same or similarly to server devices 200A in server cluster 220A. On the other hand, in some embodiments, server devices 200A, 200B, and 200C each may be configured to perform different functions. For example, server devices 200A may be configured to perform one or more functions of server device 110, and server devices 200B and server device 200C may be configured to perform functions of one or more other server devices. Similarly, the functions of server data storage device 112 can be dedicated to a single server cluster, or spread across multiple server clusters.

Cluster data storages 222A, 222B, and 222C of the server clusters 220A, 220B, and 220C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 110 and server data storage device 112 can be distributed across server clusters 220A, 220B, and 220C, various active portions and/or backup/redundant portions of these components can be distributed across cluster data storages 222A, 222B, and 222C. For example, some cluster data storages 222A, 222B, and 222C may be configured to store backup versions of data stored in other cluster data storages 222A, 222B, and 222C.

Cluster routers 224A, 224B, and 224C in server clusters 220A, 220B, and 220C, respectively, may include networking equipment configured to provide internal and external communications for the server clusters. For example, cluster routers 224A in server cluster 220A may include one or more packet-switching and/or routing devices configured to provide (i) network communications between server devices 200A and cluster data storage 222A via cluster network 226A, and/or (ii) network communications between the server cluster 220A and other devices via communication link 228A to network 108. Cluster routers 224B and 224C may include network equipment similar to cluster routers 224A, and cluster routers 224B and 224C may perform networking functions for server clusters 220B and 220C that cluster routers 224A perform for server cluster 220A.

Additionally, the configuration of cluster routers 224A, 224B, and 224C can be based at least in part on the data communication requirements of the server devices and cluster storage arrays, the data communications capabilities of the network equipment in the cluster routers 224A, 224B, and 224C, the latency and throughput of the local cluster networks 226A, 226B, 226C, the latency, throughput, and cost of the wide area network connections 228A, 228B, and 228C, and/or other factors that may contribute to the cost, speed, fault-tolerance, resiliency, efficiency and/or other design goals of the system architecture.

D. Client Device

Figure 3:
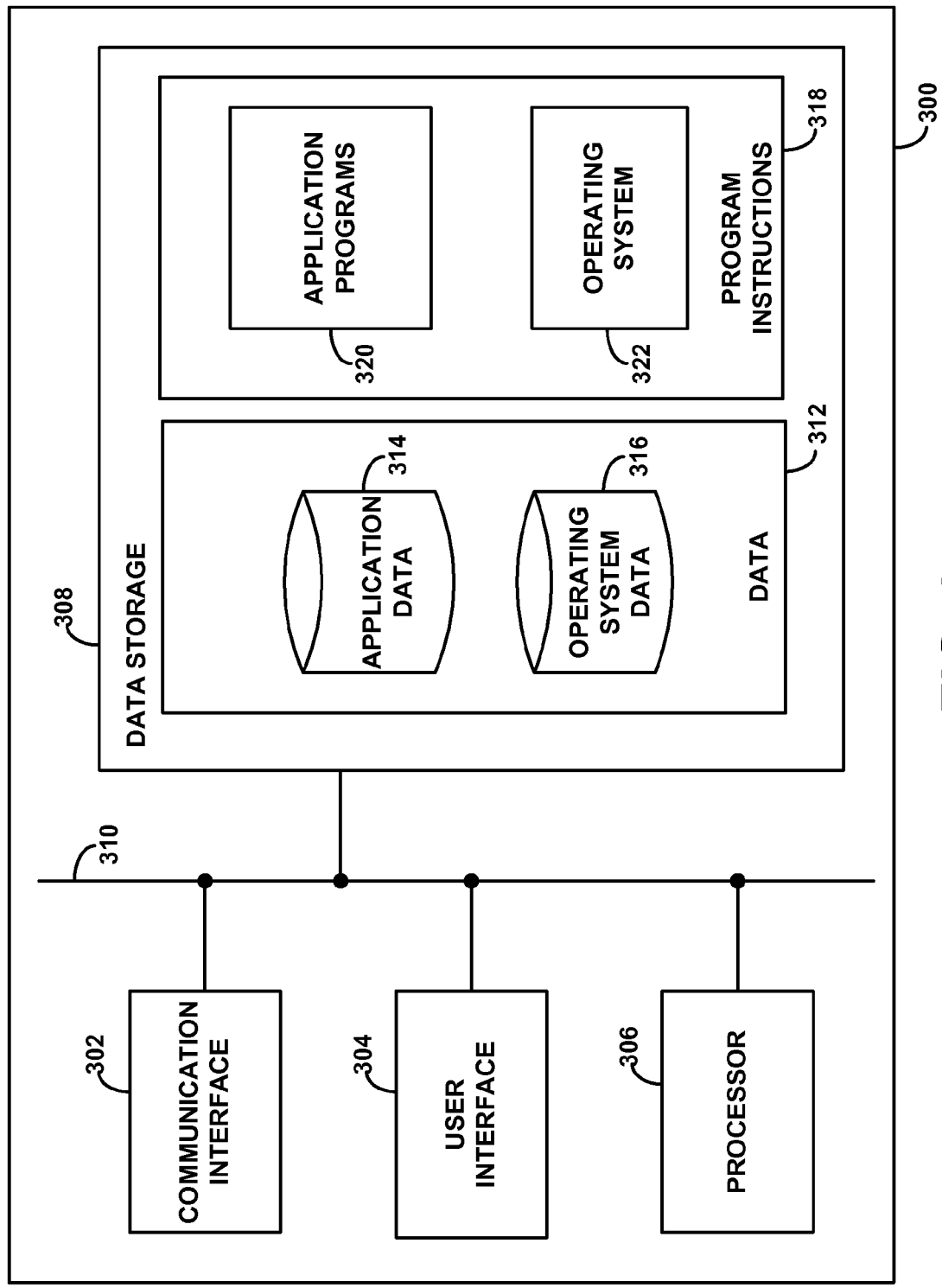
FIG. 3 depicts a block diagram of a client device, in accordance with an example embodiment.

FIG. 3 is a simplified block diagram showing some of the components of an example client device 300. By way of example and without limitation, client device 300 may be a "plain old telephone system" (POTS) telephone, a cellular mobile telephone, a still camera, a video camera, a fax machine, an answering machine, a computer (such as a desktop, notebook, or tablet computer), a personal digital assistant (PDA), a home automation component, a digital video recorder (DVR), a digital TV, a remote control, or some other type of device equipped with one or more wireless or wired communication interfaces.

As shown in FIG. 3, client device 300 may include a communication interface 302, a user interface 304, a processor 306, and data storage 308, all of which may be communicatively linked together by a system bus, network, or other connection mechanism 310.

Communication interface 302 functions to allow client device 300 to communicate, using analog or digital modulation, with other devices, access networks, and/or transport networks. Thus, communication interface 302 may facilitate circuit-switched and/or packet-switched communication, such as POTS communication and/or IP or other packetized communication. For instance, communication interface 302 may include a chipset and antenna arranged for wireless communication with a radio access network or an access point. Also, communication interface 302 may take the form of a wireline interface, such as an Ethernet, Token Ring, or USB port. Communication interface 302 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 302. Furthermore, communication interface 302 may comprise multiple physical communication interfaces (e.g., a Wifi interface, a BLUETOOTH® interface, and a wide-area wireless interface).

User interface 304 may function to allow client device 300 to interact with a human or non-human user, such as to receive input from a user and to provide output to the user. Thus, user interface 304 may include input components such as a keypad, keyboard, touch-sensitive or presence-sensitive panel, computer mouse, trackball, joystick, microphone, still camera and/or video camera. User interface 304 may also include one or more output components such as a display screen (which, for example, may be combined with a presence-sensitive panel), CRT, LCD, LED, a display using DLP technology, printer, light bulb, and/or other similar devices, now known or later developed. User interface 304 may also be configured to generate audible output(s), via a speaker, speaker jack, audio output port, audio output device, earphones, and/or other similar devices, now known or later developed. In some embodiments, user interface 304 may include software, circuitry, or another form of logic that can transmit data to and/or receive data from external user input/output devices. Additionally or alternatively, client device 300 may support remote access from another device, via communication interface 302 or via another physical interface (not shown).

Processor 306 may comprise one or more general purpose processors (e.g., microprocessors) and/or one or more special purpose processors (e.g., DSPs, GPUs, FPUs, network processors, or ASICs). Data storage 308 may include one or more volatile and/or non-volatile storage components, such as magnetic, optical, flash, or organic storage, and may be integrated in whole or in part with processor 306. Data storage 308 may include removable and/or non-removable components.

Processor 306 may be capable of executing program instructions 318 (e.g., compiled or non-compiled program logic and/or machine code) stored in data storage 308 to carry out the various functions described herein. Therefore, data storage 308 may include a non-transitory computer-readable storage medium, having stored thereon program instructions that, upon execution by client device 300, cause client device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., address book, email, web browsing, social networking, and/or gaming applications) installed on client device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible to or hidden from a user of client device 300.

Application programs 320 may communicate with operating system 322 through one or more application programming interfaces (APIs). These APIs may facilitate, for instance, application programs 320 reading and/or writing application data 314, transmitting or receiving information via communication interface 302, receiving or displaying information on user interface 304, and so on.

In some vernaculars, application programs 320 may be referred to as "apps" for short. Additionally, application programs 320 may be downloadable to client device 300 through one or more online application stores or application markets. However, application programs can also be installed on client device 300 in other ways, such as via a web browser or through a physical interface (e.g., a USB port) on client device 300.

3. Example Automatic Speech Recognition System Overview

Before describing speaker adaptation in detail, it may be beneficial to understand overall ASR system operation. Thus, this section describes ASR systems in general, including how the components of an ASR system may interact with one another in order to facilitate speech recognition, and how some of these components may be trained.

Figure 4:
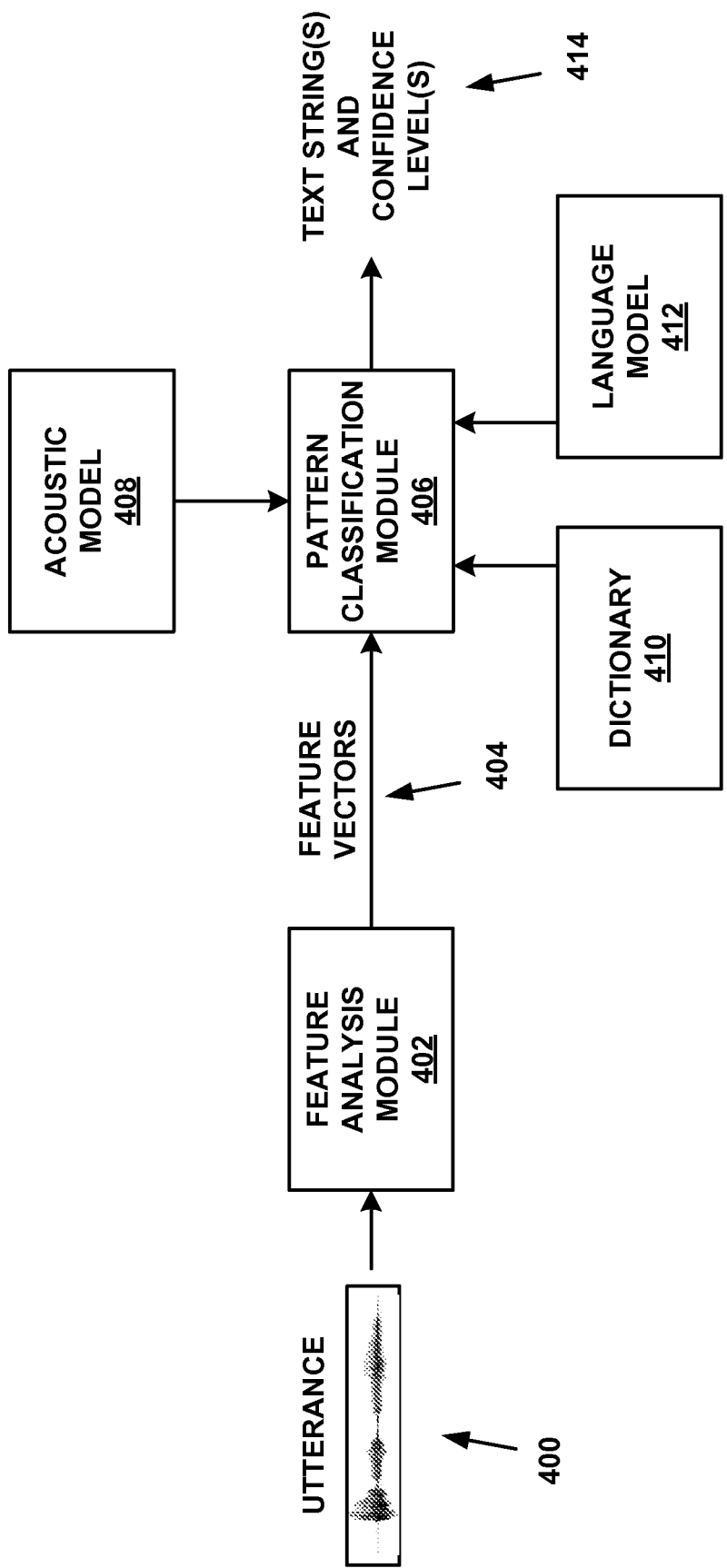
FIG. 4 depicts an ASR system, in accordance with an example embodiment.

FIG. 4 depicts an example ASR system. At run-time, the input to the ASR system may include an utterance 400, and the output may include one or more text strings and possibly associated confidence levels 414. The components of the ASR system may include a feature analysis module 402 that produces feature vectors 404, a pattern classification module 406, an acoustic model 408, a dictionary 410, and a language model 412. Pattern classification module 406 may incorporate various aspects of acoustic model 408, dictionary 410, and language model 412.

It should be noted that the discussion in this section, and the accompanying figures, are presented for purposes of example. Other ASR system arrangements, including different components, different relationships between the components, and/or different processing, may be possible.

A. Feature Analysis Module

Feature analysis module 402 may receive utterance 400. This utterance may include an analog or digital representation of human speech, and may possibly contain background noise as well. Feature analysis module 402 may convert utterance 400 to a sequence of one or more feature vectors 404. Each of feature vectors 404 may include temporal and/or spectral representations of the acoustic features of at least a portion of utterance 400. For instance, a feature vector may include mel-frequency cepstrum coefficients of such a portion.

The mel-frequency cepstrum coefficients may represent the short-term power spectrum of a portion of utterance 400. They may be based on, for example, a linear cosine transform of a log power spectrum on a nonlinear mel scale of frequency. (A mel scale may be a scale of pitches subjectively perceived by listeners to be about equally distant from one another, even though the actual frequencies of these pitches are not equally distant from one another.)

To derive these coefficients, feature analysis module 402 may sample and quantize utterance 400, divide it into overlapping or non-overlapping frames of s milliseconds, and perform spectral analysis on the frames to derive the spectral components of each frame. Feature analysis module 402 may further perform noise removal and convert the standard spectral coefficients to mel-frequency cepstrum coefficients, and then calculate first-order and second-order cepstral derivatives of the mel-frequency cepstrum coefficients.

The first-order cepstral coefficient derivatives may be calculated based on the slopes of linear regressions performed over windows of two or more consecutive frames. The second-order cepstral coefficient derivatives may be calculated based on the slopes of linear regressions performed over windows of two or more consecutive sets of first-order cepstral coefficient derivatives. However, there may be other ways of calculating the first-order and second-order cepstral coefficient derivatives.

In some embodiments, one or more frames of utterance 400 may be represented by a feature vector of mel-frequency cepstrum coefficients, first-order cepstral coefficient derivatives, and second-order cepstral coefficient derivatives. For example, the feature vector may contain 13 coefficients, 13 first-order derivatives, and 13 second-order derivatives, therefore having a length of 39. However, feature vectors may use different combinations of features in other possible embodiments.

B. Pattern Classification Module

Pattern classification module 406 may receive a sequence of feature vectors 404 from feature analysis module 402 and produce, as output, one or more text string transcriptions 414 of utterance 400. Each transcription 414 may be accompanied by a respective confidence level indicating an estimated likelihood that the transcription is correct (e.g., 80% confidence, 90% confidence, etc.).

To produce this output, pattern classification module 406 may include, or incorporate aspects of acoustic model 408, dictionary 410, and/or language model 412. In some embodiments, pattern classification module 406 may also use a search graph that represents sequences of word or sub-word acoustic features that appear in spoken utterances. The behavior of pattern classification module 406 will be described below in the context of these modules.

C. Acoustic Model

Acoustic model 408 may determine probabilities that a particular sequence of feature vectors 404 were derived from a particular sequence of spoken words and/or sub-word sounds. This may involve mapping sequences of feature vectors to one or more phonemes, and then mapping sequences of phonemes to one or more words.

A phoneme may be considered to be the smallest segment of an utterance that encompasses a meaningful contrast with other segments of utterances. Thus, a word typically includes one or more phonemes. For purposes of simplicity, phonemes may be thought of as utterances of letters, but this is not a perfect analogy, as some phonemes may present multiple letters. An example phonemic spelling for the American English pronunciation of the word "cat" is /k/ /ae/ /t/, consisting of the phonemes /k/, /ae/, and /t/. Another example phonemic spelling for the word "dog" is /d/ /aw/ /g/, consisting of the phonemes /d/, /aw/, and /g/.

Different phonemic alphabets exist, and these alphabets may have different textual representations for the various phonemes therein. For example, the letter "a" may be represented by the phoneme /ae/ for the sound in "cat," by the phoneme /ey/ for the sound in "ate," and by the phoneme /ah/ for the sound in "beta." Other phonemic representations are possible.

Common phonemic alphabets for American English contain about 40 distinct phonemes. Each of these phonemes may be associated with a different distribution of feature vector values. Thus, acoustic model 408 may be able to estimate the phoneme(s) in a feature vector by comparing the feature vector to the distributions for each of the 40 phonemes, and finding one or more phonemes that are most likely represented by the feature vector.

One way of doing so is through use of a hidden Markov model (HMM). An HMM may model a system as a Markov process with unobserved (i.e., hidden) states. Each HMM state may be represented as a multivariate Gaussian distribution that characterizes the statistical behavior of the state. Additionally, each state may also be associated with one or more state transitions that specify the probability of making a transition from the current state to another state.

When applied to an ASR system, the combination of the multivariate Gaussian distribution and the state transitions for each state may define a time sequence of feature vectors over the duration of one or more phonemes. Alternatively or additionally, the HMM may model the sequences of phonemes that define words. Thus, some HMM-based acoustic models may also consider phoneme context when a mapping a sequence of feature vectors to one or more words.

Figure 5:
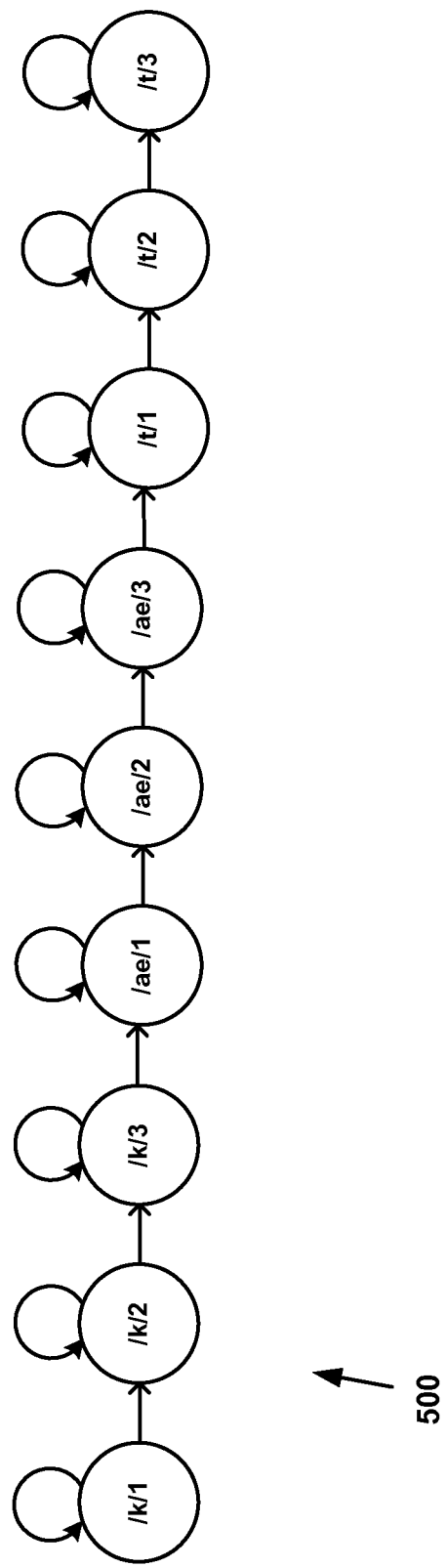
FIG. 5 depicts aspects of an acoustic model, in accordance with an example embodiment.

FIG. 5 depicts an example HMM-based acoustic model 500. Acoustic model 500 defines a sequence of phonemes that make up the word "cat." Thus, each phoneme is represented by a 3-state HMM with an initial state, a middle state, and an end state representing the statistical characteristics at the beginning of phoneme, the middle of the phoneme, and the end of the phoneme, respectively. Each state (e.g., state /k/1, state /k/2, etc.) may represent a phoneme and may include one or more transitions.

Acoustic model 500 may represent a word by concatenating the respective 3-state HMMs for each phoneme in the word together, with appropriate transitions. These concatenations may be performed based on information in dictionary 410, as discussed below. In some implementations, more or fewer states per phoneme may be used in an acoustic model.

An acoustic model may be trained using recordings of each phoneme in numerous contexts (e.g., various words and sentences) so that a representation for each of the phoneme's states can be obtained. These representations may encompass the multivariate Gaussian distributions discussed above.

In order to train the acoustic model, a possibly large number of utterances containing spoken phonemes may each be associated with transcriptions. These utterances may be words, sentences, and so on, and may be obtained from recordings of everyday speech or some other source. The transcriptions may be high-accuracy automatic or manual (human-made) text strings of the utterances.

The utterances may be segmented according to their respective transcriptions. For instance, training of the acoustic models may involve segmenting the spoken strings into units (e.g., using either a Baum-Welch and/or Viterbi alignment method), and then using the segmented utterances to build distributions for each phoneme state.

Consequently, as more data (utterances and their associated transcriptions) are used for training, a more accurate acoustic model is expected to be produced. However, even a well-trained acoustic model may have limited accuracy when used for ASR in a domain for which it was not trained. For instance, if an acoustic model is trained by utterances from a number of speakers of American English, this acoustic model may perform well when used for ASR of American English, but may be less accurate when used for ASR of, e.g., British English.

Also, if an acoustic model is trained using utterances from a number of speakers, it will likely end up representing each phoneme as a statistical average of the pronunciation of this phoneme across all of the speakers. Thus, an acoustic model trained in this fashion may represent the pronunciation and usage of a hypothetical average speaker, rather than any particular speaker.

For purposes of simplicity, throughout this specification and the accompanying drawings, it is assumed that acoustic models represent phonemes as context-dependent phonemic sounds. However, acoustic models that use other types of representations are within the scope of the embodiments herein.

D. Dictionary

TABLE 1

| Word | Phonemic Interpretation |
|---|---|
| cat | /k/ /ae/ /t/ |
| and | /ay/ /n/ /d/ |
| dog | /d/ /aw/ /g/ |

As noted above, dictionary 410 may define a pre-established mapping between phonemes and words. This mapping may include a list of tens or hundreds of thousands of phoneme-pattern-to-word mappings. Thus, in some embodiments, dictionary 410 may include a lookup table, such as Table 1. Table 1 illustrates how dictionary 410 may list the phonemic sequences that pattern classification module 406 uses for the words that the ASR system is attempting to recognize. Therefore, dictionary 410 may be used when developing the phonemic state representations of words that are illustrated by acoustic model 500.

E. Language Model

Language model 412 may assign probabilities to sequences of phonemes or words, based on the likelihood of that sequence of phonemes or words occurring in an input utterance to the ASR system. Thus, for example, language model 412 may define the conditional probability of $w_n$ (the nth word in a phrase transcribed from an utterance), given the values of the pattern of n−1 previous words in the phrase. More formally, language model 412 may define $$P(w_n|w_1,w_2,\ldots,w_{n-1})$$

In general, a language model may operate on n-grams, which, for example, may be sequences of n phonemes or words that are represented in pattern classification module 406. In practice, language models with values of n greater than 5 are rarely used because of their computational complexity, and also because smaller n-grams (e.g., 3-grams, which are also referred to as tri-grams) tend to yield acceptable results. In the example described below, tri-grams are used for purposes of illustration. Nonetheless, any value of n may be may be used with the embodiments herein.

Language models may be trained through analysis of a corpus of text strings. This corpus may contain a large number of words, e.g., hundreds, thousands, millions or more. These words may be derived from utterances spoken by users of an ASR system and/or from written documents. For instance, a language model can be based on the word patterns occurring in human speech, written text (e.g., emails, web pages, reports, academic papers, word processing documents, etc.), and so on.

From such a corpus, tri-gram probabilities can be estimated based on their respective number of appearances in the training corpus. In other words, if $C(w_1, w_2, w_3)$ is the number of occurrences of the word pattern $w_1, w_2, w_3$ in the corpus, then $$P(w_3 | w_1, w_2) \approx \frac{C(w_1, w_2, w_3)}{C(w_1, w_2)}$$

Thus, a language model may be represented as a table of conditional probabilities. Table 2 illustrates a simple example of such a table that could form the basis of language model 406. Particularly, Table 2 contains tri-gram conditional probabilities.

TABLE 2

| Tri-gram Conditional Probabilities |
|---|
| P(dog\|cat,and) = 0.50 |
| P(mouse\|cat,and) = 0.35 |
| P(bird\|cat,and) = 0.14 |
| P(fiddle\|cat,and) = 0.01 |

For the 2-gram prefix "cat and," Table 2 indicates that, based on the observed occurrences in the corpus, 50% of the time the next 1-gram is "dog." Likewise, 35% of the time, the next 1-gram is "mouse," 14% of the time the next 1-gram is "bird," and 1% of the time the next 1-gram is "fiddle." Clearly, in a fully-trained ASR system, the language model would contain many more entries, and these entries would include more than just one 2-gram prefix.

Nonetheless, using the observed frequencies of word patterns from a corpus of speech (and/or from other sources) is not perfect, as some acceptable tri-grams may not appear in the corpus, and may therefore be assigned a probability of zero. Consequently, when given a zero-probability tri-gram at run time, the language model may instead attempt to map this tri-gram to a different tri-gram associated with a non-zero probability.

In order to reduce this likelihood, the language model may be smoothed so that zero-probability tri-grams have small non-zero probabilities, and the probabilities of the tri-grams in the corpus are reduced accordingly. In this way, tri-grams not found in the corpus can still be recognized by the language model.

4. Example Automatic Speech Recognition System Operation

Once acoustic model 408 and language model 412 are appropriately trained, feature analysis model 402 and pattern classification module 406 may be used to perform ASR. Provided with an input utterance, the ASR system can search the space of valid word sequences from the language model to find the word sequence with the maximum likelihood of having been spoken in the utterance. A challenge with doing so is that the size of the search space can be quite large, and therefore performing this search may take an excessive amount computing resources (e.g., processing time and memory utilization). Nonetheless, there are some heuristic techniques that can be used to reduce the complexity of the search, potentially by orders of magnitude.

For instance, a finite state transducer (FST) can be used to compactly represent multiple phoneme patterns that map to a single word. Some words, such as "data," "either," "tomato,"

and "potato," have multiple pronunciations. The phoneme sequences for these pronunciations can be represented in a single FST per word.

This process of creating efficient phoneme-level FSTs can be carried out for each word in dictionary 410, and the resulting word FSTs can be combined into sentence FSTs using the language model 412. Ultimately, a very large network of states for phonemes, words, and sequences of words can be developed and represented in a compact search graph.

Figure 6:
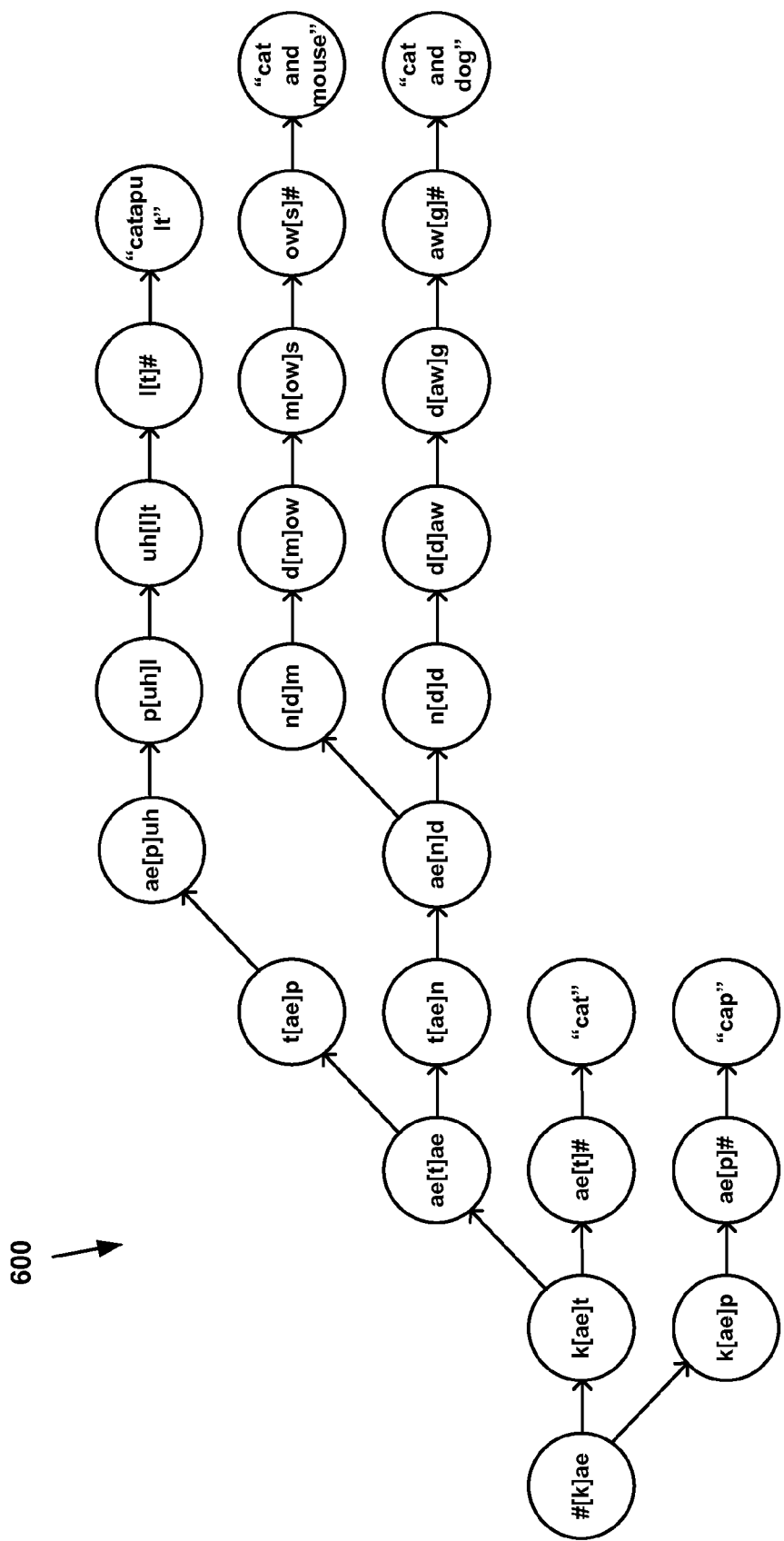
FIG. 6 depicts an ASR system search graph, in accordance with an example embodiment.

FIG. 6 contains an example search graph 600. In order to be illustrative, search graph 600 is much smaller and less complex than a search graph that would be used in an actual ASR system. Particularly, search graph 600 was trained with only the five input utterances, "catapult," "cat and mouse," "cat and dog," "cat," and "cap."

Each circle in search graph 408 may represent a state associated with the processing of an input utterance that has been mapped to phonemes. For purposes of simplicity, each phoneme in search graph 600 is represented with a single state rather than multiple states. Also, self-transitions are omitted from search graph 600 in order to streamline FIG. 6.

The states in search graph 600 are named based on the current phoneme context of the input utterance, using the format "x[y]z" to indicate that the current phoneme being considered, y, has a left-context of the phoneme x and a right context of the phoneme z. In other words, the state "x[y]z" indicates a point in processing an utterance in which the current phoneme being considered is y, the previously phoneme in the utterance is x, and the next phoneme in the utterance is z. The beginning of an utterance and the end of an utterance are represented by the "#" character, and also may be referred to as null phonemes.

Terminal states may be represented by a recognized word or phrase in quotes. Search graph 600 includes five terminal states, representing recognition of the words or phrases "catapult," "cat and mouse," "cat and dog," "cat," and "cap."

Transitions from one state to another may represent an observed ordering of phonemes in the corpus. For instance, the state "#[k]ae" represents the recognition of a "k" phoneme with a left context of a null phoneme and a right context of an "ae" phoneme. There are two transitions from the state "#[k]ae"—one for which the next phoneme (the phoneme after the "ae") is a "t" and another for which the next phoneme is a "p."

Based on acoustic model 408, dictionary 410, and language model 412, costs may be assigned to one or more of the states and/or transitions. For example, if a particular phoneme pattern is rare, a transition to a state representing that phoneme pattern may have a higher cost than a transition to a state representing a more common phoneme pattern. Similarly, the conditional probabilities from the language model (see Table 2 for examples) may also be used to assign costs to states and/or transitions. For instance, in Table 2, given a phrase with the words "cat and," the conditional probability of the next word in the phrase being "dog" is 0.5, while the conditional probability of the next word in the phrase being "mouse" is 0.35. Therefore, the transition from state "ae[n]d" to state "n[d]m" may have a higher cost than the transition from state "ae[n]d" to state "n[d]d."

Search graph 600, including any states, transitions between states, and associated costs therein, may be used to estimate text string transcriptions for new input utterances. For example, pattern classification module 406 may determine a sequence of one or more words that match an input utterance based on search graph 600. Formally, pattern classification module 406 may attempt to find $$w^* = \mathrm{argmax}_w P(a|w) P(w)$$

where a is a stream of feature vectors derived from the input utterance, P(a|w) represents the probability of those feature vectors being produced by a word sequence w, and P(w) is the probability assigned to w by language model 412. For example, P(w) may be based on n-gram conditional probabilities as discussed above, as well as other factors. The function $\mathrm{argmax}_w$ may return the value of w that maximizes P(a|w)P(w).

To find text strings that may match utterance 400, pattern classification module 406 may attempt to find paths from an initial state in search graph 600 to a terminal state in search graph 600 based on feature vectors 404. This process may involve pattern classification module 406 performing a breadth-first search, depth-first search, beam search, or some other type of search on search graph 600. Pattern classification module 406 may assign a total cost to one or more paths through search graph 600 based on costs associated with the states and/or transitions of associated with each path. Some of these costs may be based on, for instance, a confidence level that a particular segment of the utterance maps to a particular sequence of phonemes in the path.

As an example, suppose that utterance 400 is the phrase "cat and dog." In a possible scenario, pattern classification module 406 would step through search graph 600 phoneme by phoneme to find the path beginning with initial state "#[k]ae" and ending with terminal state "cat and dog." Pattern classification module 406 may also find one or more additional paths through search graph 600. For example, pattern classification module 406 may also associate utterance 400 with the path with initial state "#[k]ae" and ending with terminal state "cat and mouse," and with the path with initial state "#[k]ae" and ending with terminal state "catapult." Nonetheless, pattern classification module 406 may assign a lower cost to the path with terminal state "cat and dog" than to other paths. Consequently, the path with terminal state "cat and dog" may be selected as the "best" transcription for the input utterance.

It should be understood that ASR systems can operated in many different ways. The embodiments described above are presented for purposes of illustration and may not be the only way in which an ASR system operates.

5. Examples of Multi-Stage Speaker Adaptation

As noted above, acoustic models are typically trained with utterances from multiple speakers in multiple environments. As a result, a given acoustic model may represent a hypothetical average speaker, and might not perform well when applied to utterances from a speaker whose vocal characteristics differ from those of the hypothetical average speaker. Therefore, ASR systems may attempt to compensate for these differences through speaker adaptation.

A. Speaker Adaptation Profiles

Figure 7:
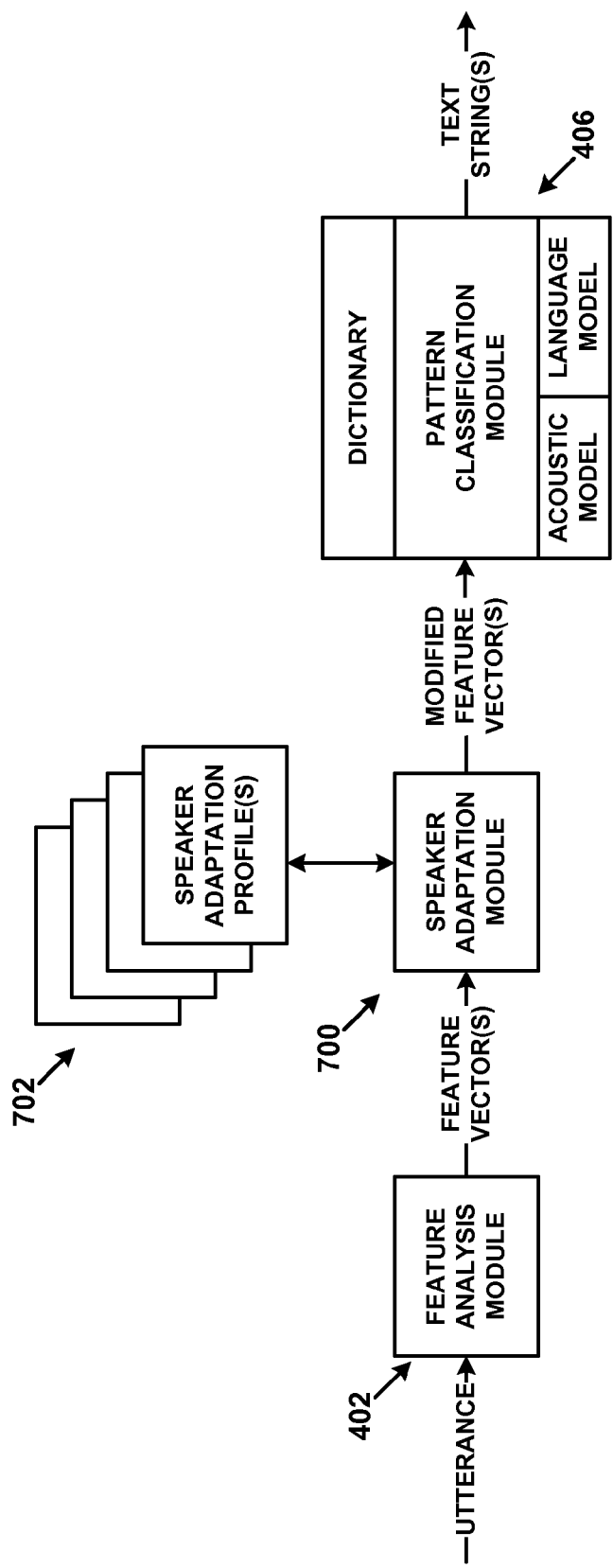
FIG. 7 depicts an ASR system that supports speaker adaptation, in accordance with an example embodiment.

FIG. 7 depicts an example ASR system with speaker adaptation. Particularly, an utterance is provided as input to feature analysis module 400, which produces one or more feature vectors based on the utterance. These feature vectors may be provided to speaker adaptation module 700, which may modify the feature vectors according to one or more of speaker adaptation profile(s) 702. The modified feature vectors may be provided to pattern classification module 406, which in turn may produce one or more text string transcriptions of the utterance.

Speaker adaptation profiles 702 may include default, gender-specific, and/or speaker-dependent profiles. A default profile may be a profile that the ASR system uses when no other profile has been selected. For instance, when the ASR system begins speech recognition, it may apply the default profile to feature vectors. Additionally, the default profile may be applied to utterances received after the ASR system has been idle for some period of time (e.g., 1-10 minutes or more) or after the ASR system detects that the speaker has changed. In some embodiments, the default profile may not perform any speaker adaptation—in other words, for some default profiles, the modified feature vectors may be the same as the feature vectors.

Speaker-adaptation profiles 702 may also include one or more environment-specific, speaker-dependent profiles. Each of these profiles may be associated with a particular speaker speaking in a particular environment or location. For example, one such profile might be based on the particular speaker speaking in a quiet location, with little background noise. Another such profile might be based on the particular speaker speaking in an environment with a given type of background noise, such as an office or a car. Thus, an environment-specific, speaker-dependent speaker adaptation profile for the speaker may be based on the characteristics of the input utterances, the speaker's location, and or the user device that receives the utterance.

As noted above, each of the feature vectors may be of a particular length (e.g., n entries), and may include representations of the temporal and/or spectral acoustic features of at least a portion of the utterance. In some embodiments, the speaker adaptation parameters may take the form of a matrix, for instance, an n×n matrix. In order to perform speaker adaptation, speaker adaptation module 700 may multiply each feature vector it receives by the matrix, resulting in updated feature vectors. These updated feature vectors may be transmitted to pattern classification module 406.

The acoustic model used by pattern classification module 406 may be speaker-independent, and speaker adaptation module 700 may use the matrix to adapt speaker-dependent feature vectors so that they are more likely to be properly recognized by the acoustic model. In some cases, the matrix may be a diagonal matrix (i.e., for each entry (i,j) in the matrix, the entry takes on a non-zero value if i is equal to j, but takes on a value of zero if i is not equal to j). Since at least half of the entries in a 2×2 or greater diagonal matrix contain zeroes, less computation is required to multiply a feature vector by a diagonal matrix than a non-diagonal matrix. (Herein, a non-diagonal matrix refers to a matrix in which at least one entry for which i is not equal to j contains a non-zero value.)

B. Gaussian Mixture Models as Speech Models

From time to time, periodically, and/or on an ongoing basis, the ASR system may compare the characteristics of received utterances to speech models associated with one or more speaker adaptation profiles. Based on the outcome of this comparison, a new speaker adaptation profile may be selected, or the current speaker adaptation profile may continue to be applied.

In some embodiments, the speech models may be represented as Gaussian mixture models (GMMs). A GMM may probabilistically represent the likelihood that a particular speaker is speaking based on feature vectors derived from an input utterance. Formally, a GMM may be a weighted sum of M Gaussian random variables, each with potentially different mean and covariance parameters. An example GMM is given by the equation $$p\left(x|w_i, \mu_i, \Sigma_i\right) = \sum_{i=1}^{M} w_i g(x|\mu_i, \Sigma_i), \quad i = 1 \ldots M$$

where x is an n-dimensional feature vector, $w_i$ are weights such that $\Sigma_{i=1}^{M} w_i = 1$, and $g(x|\mu_i, \Sigma_i)$ is an n-dimensional Gaussian function with a mean of $\mu_i$ and a covariance matrix of $\Sigma_i$. The speech model for a given profile may be represented as $$\lambda = \{w_i, \mu_i, \Sigma_i\}, i = 1 \ldots M$$

GMMs can be used to approximate arbitrarily-shaped probability density functions. Thus, GMMs are powerful tools for representing distributions of feature vectors in ASR systems. In some implementations, full covariance matrices are not used, as partial covariance matrices (e.g., diagonal matrices wherein each non-zero entry represents the variance of a particular component Gaussian function) can provide suitable results.

C. Profile Selection

Assume that the ASR system has access to a set of S speaker adaptation profiles represented by speech models $\lambda_1, \lambda_2, \ldots, \lambda_S$, respectively. A goal of speaker adaptation is to select the profile, $\hat{S}$, with a speech model that has the maximum a posteriori probability of being the closest fit for a series of feature vectors. Formally, $$\hat{S} = \text{argmax}_{1 \le k \le S} p(\lambda_k | X) = \text{argmax}_{1 \le k \le S} \sum_{t=1}^{T} \log p(x_t, \lambda_k)$$

where X is a series of T feature vectors, $x_t$, $1 \le t \le T$. The final equation can be derived from $\text{argmax}_{1 \le k \le S} p(\lambda_k | X)$ through application of Bayes Rule and some simplifying assumptions. Note that $p(x_t|\lambda_k) = p(x_t|w_k, \mu_k, \Sigma_k)$, and thus the solution to this term is provided by the equations in Section 5B.

When selecting a profile, any value of T may be used. For instance, assuming that a feature vector is derived from 10 milliseconds of an input utterance, anywhere from one to several thousand feature vectors may be evaluated according to the equations above, and a profile that fits a majority of the feature vectors may be selected.

D. Speech Model Training

A speech model for a particular speaker adaptation profile (e.g., for speakers of a specific gender, a particular speaker, and/or a particular speaker in a specific environment or location) may be trained based on input utterances. For instance, a female-specific speech model may be trained with utterances from various female speakers in various environments. A speaker-dependent speech model may be trained with utterances from a particular speaker in various environments. An environment-specific, speaker-dependent speech model may be trained with utterances from a particular speaker in a particular environment.

One way of conducting this training is to iteratively calculate a maximum likelihood estimate of a GMM given T observed feature vectors using an expectation-maximization technique. Particularly, this technique provides estimates of the parameters $\lambda = \{w_i, \mu_i, \Sigma_i\}$. Formally, $$\overline{w}_i = \frac{1}{T} \sum_{t=1}^{T} p(i | x_t, \lambda)$$

-continued $$\bar{\mu}_i = \frac{\sum_{t=1}^{T} p(i \mid x_t, \lambda) x_t}{\sum_{t=1}^{T} p(i \mid x_t, \lambda)}$$

$$\bar{\sigma}_i^2 = \frac{\sum_{t=1}^{T} p(i \mid x_t, \lambda) x_t^2}{\sum_{t=1}^{T} p(i \mid x_t, \lambda)} - \bar{\mu}_i^2$$

where $$p(i \mid x_t, \lambda) = \frac{w_i g(x_t \mid \mu_i, \Sigma_i)}{\sum_{k=1}^{M} w_k g(x_t \mid \mu_k, \Sigma_k)}$$

Note that, for sake of simplicity, these equations only calculate the variances, $\sigma_i^2$, rather than the full covariance matrix, $\Sigma_i$. However, as noted above, these variances can be used to form a diagonal covariance matrix that is sufficient for this example embodiment.

E. Example Embodiments of Speaker Adaptation

Figure 8A:
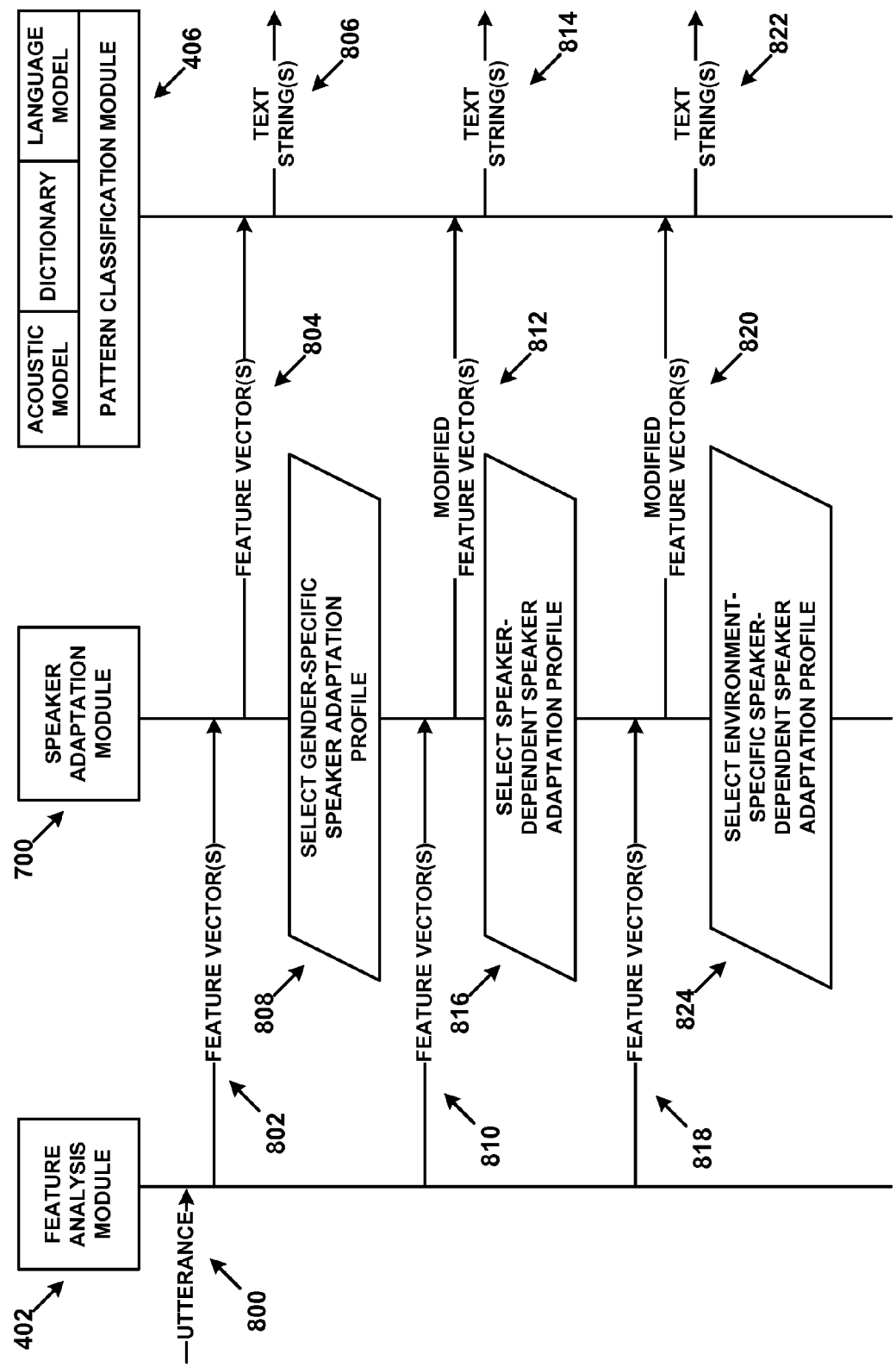
FIG. 8A is a message flow diagram of speaker adaptation, in accordance with an example embodiment.

FIG. 8A is a message flow illustrating an example embodiment of speaker adaptation. This embodiment involves feature analysis module 402, speaker adaptation module 700, and pattern classification module 406. However, speaker adaptation may be performed entirely by speaker adaptation module 700, and other modules may not be aware that speaker adaptation is occurring. Alternatively, speaker adaptation may involve other modules. For instance, some embodiments of speaker adaptation may adapt the acoustic model of pattern classification module 406 to the speech characteristics of one or more speakers.

Additionally, the modules in FIG. 8A may be contained in a single computing device (e.g., a tablet computer, personal computer, or wireless communication device), or may be distributed between two or more devices (e.g., between a client device and a server device). Furthermore, it is assumed that speaker adaptation module 700 has access to one or more speaker adaptation profiles.

At step 800, feature analysis module 402 may receive an utterance. At step 802, one or more feature vectors derived from this utterance may be provided to speaker adaptation module 700.

In some embodiments, when speaker adaptation module 700 receives these feature vectors, speaker adaptation module 700 might not be configured for speaker adaptation (e.g., speaker adaptation module 700 may be configured to not apply speaker adaptation to received feature vectors). Thus, at step 804, the unmodified feature vectors may be provided to pattern classification module 406. However, in other embodiments, speaker adaptation module 700 may be configured to apply a particular speaker adaptation technique to input feature vectors. Regardless, at step 806, pattern classification module 406 may provide one or more text strings as ASR system output. These text strings may represent transcriptions of utterance 800.

At step 808, possibly based on the characteristics of the feature vectors provided in step 802, speaker adaptation module 700 may select a speaker adaptation profile associated with a gender-specific speaker adaptation technique. The selection process may involve speaker adaptation module 700 comparing these feature vectors to one or more speaker adaptation profiles, choosing a speaker adaptation profile that fits the characteristics of the feature vectors, and applying the associated speaker adaptation technique to subsequently-received feature vectors.

As noted above, for small samples of an utterance, and/or for utterances of a short duration, the characteristics of feature vectors from these utterances may not sufficiently fit speaker-dependent speaker adaptation profiles. Thus, prior to identifying a particular individual as the speaker and applying that speaker's speaker adaptation profile, speaker adaptation module 700 may estimate the gender of the speaker and apply a gender-specific speaker adaptation technique based on the estimated gender.

In addition to or instead of comparing the characteristics of feature vectors to speaker adaptation profiles, estimating the gender of a speaker may involve comparing the frequencies represented by the feature vectors to a frequency threshold. If the frequencies represented by the feature vectors are generally above this frequency threshold, the speaker may be estimated to be female. If the frequencies represented by the feature vectors are generally below the frequency threshold, the speaker may be estimated to be male. The frequency threshold may vary based on the phoneme represented by the feature vectors. Therefore, step 808 may involve speaker adaptation module 700 selecting either a male-specific speaker adaptation technique or a female-specific speaker adaptation technique based on the received feature vectors.

At step 810, additional feature vectors may be provided by feature analysis module 402. These feature vectors may be derived from the utterance of step 800 or some other utterance. Speaker adaptation module 700 may apply the selected gender-specific speaker adaptation technique to these feature vectors to produce modified feature vectors. At step 812, speaker adaptation module 700 may provide these modified feature vectors to pattern classification module 406. At step 814, pattern classification module 406 may provide one or more text strings as ASR system output. These text strings may be based on the application of the selected gender-specific speaker adaptation technique to these feature vectors.

Additionally, at step 816, speaker adaptation module 700 may select a speaker adaptation profile associated with a speaker-dependent speaker adaptation technique. Thus, speaker adaptation module 700 may compare the feature vectors of step 810 (and possibly the feature vectors of step 802 as well) to one or more speaker adaptation profiles. Provided that speaker adaptation module 700 has received a sufficient number of feature vectors to identify the speaker, speaker adaptation module 700 may choose a speaker adaptation profile that fits the characteristics of the feature vectors. This process may include use of the equations discussed in Section 5C.

At step 818, more feature vectors may be provided by feature analysis module 402. These feature vectors also may be derived from the utterance of step 800 and/or some other utterance. Speaker adaptation module 700 may apply the selected speaker-dependent speaker adaptation technique to these feature vectors to produce modified feature vectors. At step 820, speaker adaptation module 700 may provide these modified feature vectors to pattern classification module 406. At step 822, pattern classification module 406 may provide one or more text strings as ASR system output. These text strings may be based on the application of the selected speaker-dependent speaker adaptation technique to these feature vectors.

Additionally, at step 824, speaker adaptation module 700 may select a speaker adaptation profile associated with an environment-specific, speaker-dependent speaker adaptation technique. Thus, speaker adaptation module 700 may compare the feature vectors of step 818 (and possibly the feature vectors of steps 802 and 810 as well) to one or more speaker adaptation profiles of the selected speaker. Presuming that speaker adaptation module 700 has received a sufficient number of feature vectors to identify the environment in which the speaker is speaking, speaker adaptation module 700 may choose a speaker adaptation profile that fits the characteristics of the feature vectors. This process may also include use of the equations discussed in Section 5C.

FIG. 8A illustrates a speaker adaptation module employing a multi-stage process to refine speaker adaptation from a general technique (e.g., no speaker adaptation), to a gender-specific technique, then to a speaker-dependent technique, and then to an environment-specific, speaker-dependent technique. However, multi-stage speaker identification may refine speaker adaptation in other ways. Particularly, as the speaker providing utterances changes, a speaker adaptation module may switch between two or more speaker-dependent speaker adaptation techniques. Alternatively or additionally, the speaker adaptation module may switch from using a speaker-dependent technique to a speaker-independent technique or a gender-specific technique, and/or from an environment-specific, speaker-dependent technique to a speaker-independent technique, a gender-specific technique, or a speaker-dependent technique.

Figure 8B:
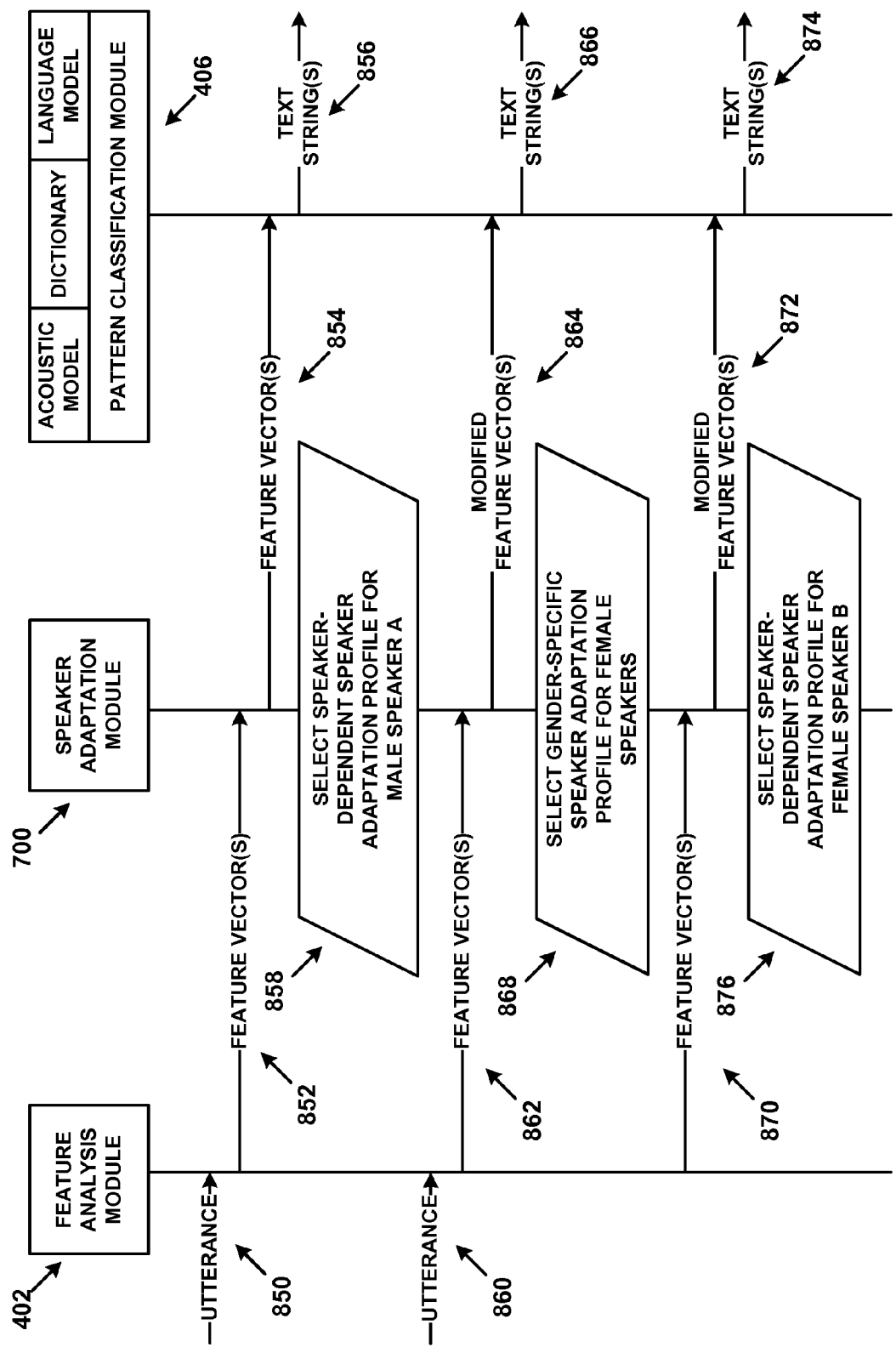
FIG. 8B is another message flow diagram of speaker adaptation, in accordance with an example embodiment.

FIG. 8B is another message flow illustrating an example embodiment of speaker adaptation. This embodiment also involves feature analysis module 402, speaker adaptation module 700, and pattern classification module 406. However, like the example embodiment of FIG. 8A, more or fewer modules may be included in speaker adaptation procedures, and the modules may be contained in a single computing device or distributed between two or more devices. Again, it is assumed that speaker adaptation module 700 has access to one or more speaker adaptation profiles. For instance, these speaker adaptation profiles may include a male-specific speaker adaptation profile, a female-specific speaker adaptation profile, a speaker-dependent speaker-adaptation profile for male speaker A, and a speaker-dependent speaker-adaptation profile for female speaker B.

At step 850, feature analysis module 402 may receive an utterance. It is assumed that this utterance was made by male speaker A. At step 852, feature analysis module 402 may provide one or more feature vectors derived from this utterance to speaker adaptation module 700.

In some embodiments, when speaker adaptation module 700 receives these feature vectors, speaker adaptation module 700 might not be configured for speaker adaptation. Thus, at step 854, the unmodified feature vectors may be provided to pattern classification module 406. However, in other embodiments, speaker adaptation module 700 may be configured to apply a particular speaker adaptation technique to input feature vectors. Regardless, at step 856, pattern classification module 406 may provide one or more text strings as ASR system output. These text strings may represent transcriptions of utterance 850.

At step 858, possibly based on the characteristics of the feature vectors provided in step 852, speaker adaptation module 700 may select a speaker adaptation profile associated with a speaker-dependent speaker adaptation technique. The selection process may involve speaker adaptation module 700 comparing these feature vectors to one or more speaker adaptation profiles, choosing a speaker adaptation profile that fits the characteristics of the feature vectors, and applying the associated speaker adaptation technique to subsequently-received feature vectors. In this case, speaker adaptation module 700 may select a speaker-dependent speaker adaptation profile for male speaker A. Consequently, speaker adaptation module 700 may apply an associated speaker-dependent speaker adaptation technique to received feature vectors while this profile is selected.

In some embodiments, step 858 may be implemented in multiple discrete steps. For example, speaker adaptation module 700 may first select a gender-specific speaker adaptation profile, apply this profile to at least some feature vectors, then select the speaker-dependent speaker adaptation profile for male speaker A.

At step 860, feature analysis module 402 may receive another utterance. It is assumed that this utterance was made by female speaker B. At step 862, feature analysis module 402 may provide one or more feature vectors derived from this utterance to speaker adaptation module 700.

Since the speaker-dependent speaker adaptation technique for male speaker A is being applied, at step 864 speaker adaptation module 700 provides modified feature vectors. At step 866, pattern classification module 406 may provide one or more text strings as ASR system output. These text strings may represent transcriptions of utterance 860.

At step 868, possibly based on the characteristics of the feature vectors provided in step 862, speaker adaptation module 700 may select a speaker adaptation profile associated with a gender-specific speaker adaptation technique. The selection process may involve speaker adaptation module 700 comparing the feature vectors of step 862 to one or more speaker adaptation profiles, choosing a speaker adaptation profile that best fits the characteristics of the feature vectors, and applying the associated speaker adaptation technique to subsequently-received feature vectors. In this case, speaker adaptation module 700 may select a gender-specific speaker adaptation profile for female speakers. Consequently, speaker adaptation module 700 may apply an associated gender-specific speaker adaptation technique to received feature vectors while this profile is selected.

At step 870, more feature vectors may be provided by feature analysis module 402. These feature vectors may be derived from the utterance of step 860 or a subsequently-received utterance. Speaker adaptation module 700 may apply the selected gender-specific speaker adaptation technique to these feature vectors to produce modified feature vectors. At step 872, speaker adaptation module 700 may provide these modified feature vectors to pattern classification module 406. At step 874, pattern classification module 406 may provide one or more text strings as ASR system output. These text strings may be based on the application of the selected gender-specific speaker adaptation technique to the modified feature vectors.

Additionally, at step 876, speaker adaptation module 700 may select a speaker adaptation profile associated with a speaker-dependent speaker adaptation technique. Thus, speaker adaptation module 700 may compare the feature vectors of step 870 (and possibly the feature vectors of step 862 as well) to one or more speaker adaptation profiles. Presuming that speaker adaptation module 700 has received a sufficient number of feature vectors to identify the speaker, speaker adaptation module 700 may choose a speaker adaptation profile that fits the characteristics of the feature vectors. Thus, speaker adaptation module 700 may select a speaker-dependent speaker adaptation profile for female speaker B. An associated speaker adaptation technique may be applied to subsequently-received feature vectors.

Further, an environment-specific, speaker-dependent speaker adaptation technique for female speaker B may be subsequently applied. Alternatively or additionally, the speaker providing utterances may change back to male speaker A or some other speaker, and speaker adaptation module 700 may select a new speaker adaptation profile accordingly.

It should be understood that the embodiments illustrated in FIGS. 7, 8A, and 8B are for purposes of example. Other embodiments may be possible, including variations that change the order and/or content of the steps of FIGS. 7, 8A, and 8B. In some embodiments, more or fewer steps may be employed. Further, the embodiments of FIGS. 7, 8A, and 8B may be combined, in part or in whole. For instance, one or more steps of the embodiment of FIG. 8B could occur before, during, or after steps in the embodiment of FIG. 8A are carried out.

6. Example Operations

Figure 9:
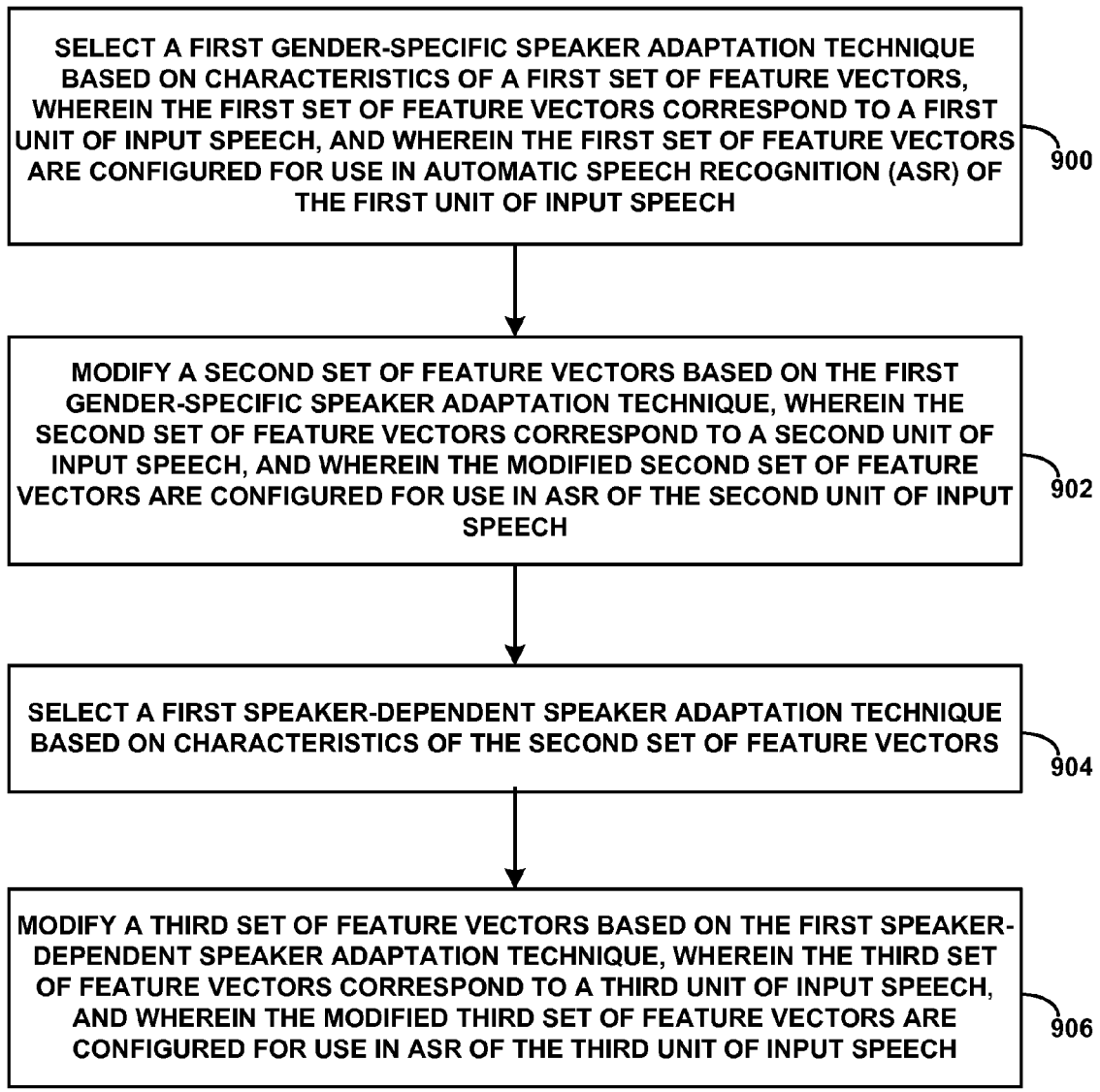
FIG. 9 is a flow chart, in accordance with an example embodiment.

FIG. 9 is a flow chart of an example embodiment. The steps illustrated by this flow chart may be carried out by various computing devices, such as client device 300, server device 200 and/or server cluster 220A. Aspects of some individual steps may be distributed between multiple computing devices.

At step 900, a first gender-specific speaker adaptation technique may be selected based on characteristics of a first set of feature vectors. The first set of feature vectors may correspond to a first unit of input speech. The first set of feature vectors may also be configured for use in ASR of the first unit of input speech. Here, a unit of speech may be an utterance, part of an utterance, or more than one utterance. Thus, each unit of speech may have been made by the same speaker or by different speakers.

At step 902, a second set of feature vectors may be modified based on the first gender-specific speaker adaptation technique. The second set of feature vectors may correspond to a second unit of input speech. The modified second set of feature vectors may be configured for use in ASR of the second unit of input speech.

At step 904, a first speaker-dependent speaker adaptation technique may be selected based on characteristics of the second set of feature vectors. Selecting the first speaker-dependent speaker adaptation technique may involve determining that the characteristics of the second set of feature vectors fit a speaker-dependent speech model associated with the first speaker-dependent speaker adaptation technique better than the characteristics of the second set of feature vectors fit one or more additional speaker-dependent speech models. In some embodiments, the first gender-specific speaker adaptation technique may be associated with a particular gender, and the first speaker-dependent speaker adaptation technique may be associated with a speaker of the particular gender.

Determining whether characteristics of feature vectors fit one or more speech models may include applying the GMM-based techniques discussed in Section 5. In some cases, the equations described in Section 5C may be used to select a speech model that appropriately fits the characteristics of the feature vectors.

At step 906, a third set of feature vectors may be modified based on the first speaker-dependent speaker adaptation technique. The third set of feature vectors may correspond to a third unit of input speech. The modified third set of feature vectors may be configured for use in ASR of the third unit of input speech.

Modifying the second set of feature vectors may involve applying a first gender-specific transform to feature vectors in the second set of feature vectors. The first gender-specific transform may be associated with the first gender-specific speaker adaptation technique. Modifying the third set of feature vectors may involve applying a first speaker-dependent transform to feature vectors in the third set of feature vectors. The first speaker-dependent transform may be associated with the first speaker-dependent speaker adaptation technique.

In some embodiments, a particular speaker may be associated with the first speaker-dependent speaker adaptation technique. In these embodiments, it may be determined that (i) the third unit of input speech was originated proximate to a particular location, and (ii) the particular speaker may also be associated with an environment-specific, speaker-dependent speaker adaptation technique. Further, the environment-specific, speaker-dependent speaker adaptation technique may be associated with the particular location. Thus, the environment-specific, speaker-dependent speaker adaptation technique may be selected, and a fourth set of feature vectors may be modified based on the environment-specific, speaker-dependent speaker adaptation technique. The fourth set of feature vectors may correspond to a fourth unit of input speech. The modified fourth set of feature vectors may be configured for use in ASR of the fourth unit of input speech.

Additionally or alternatively, a first speaker may be associated with the first speaker-dependent speaker adaptation technique. A second speaker-dependent speaker adaptation technique may be selected based on characteristics of the third set of feature vectors, where a second speaker is associated with the second speaker-dependent speaker adaptation technique.

A fourth set of feature vectors may be modified based on the second speaker-dependent speaker adaptation technique. The fourth set of feature vectors may correspond to a fourth unit of input speech. The modified fourth set of feature vectors may be configured for use in ASR of the fourth unit of input speech.

Furthermore, the first gender-specific speaker adaptation technique may be associated with a speech model of a first gender, and a second gender-specific speaker adaptation technique may be associated with a speech model of a second gender. Selecting the first gender-specific speaker adaptation technique may involve determining that the characteristics of the first set of feature vectors fit the speech model of the first gender better than the speech model of the second gender.

Moreover, it may be determined that (i) characteristics of the third set of feature vectors fit the speech model of the second gender better than the speech model of the first gender, and (ii) the characteristics of the third set of feature vectors fit the speech model of the second gender better than speech model of the first speaker-dependent speaker adaptation technique. Perhaps in response to making this determination, the second gender-specific speaker adaptation technique may be selected.

Accordingly, a fourth set of feature vectors may be modified based on the second gender-specific speaker adaptation technique. The fourth set of feature vectors may correspond to a fourth unit of input speech. The modified fourth set of feature vectors may be configured for use in ASR of the fourth unit of input speech.

Figure 10A:
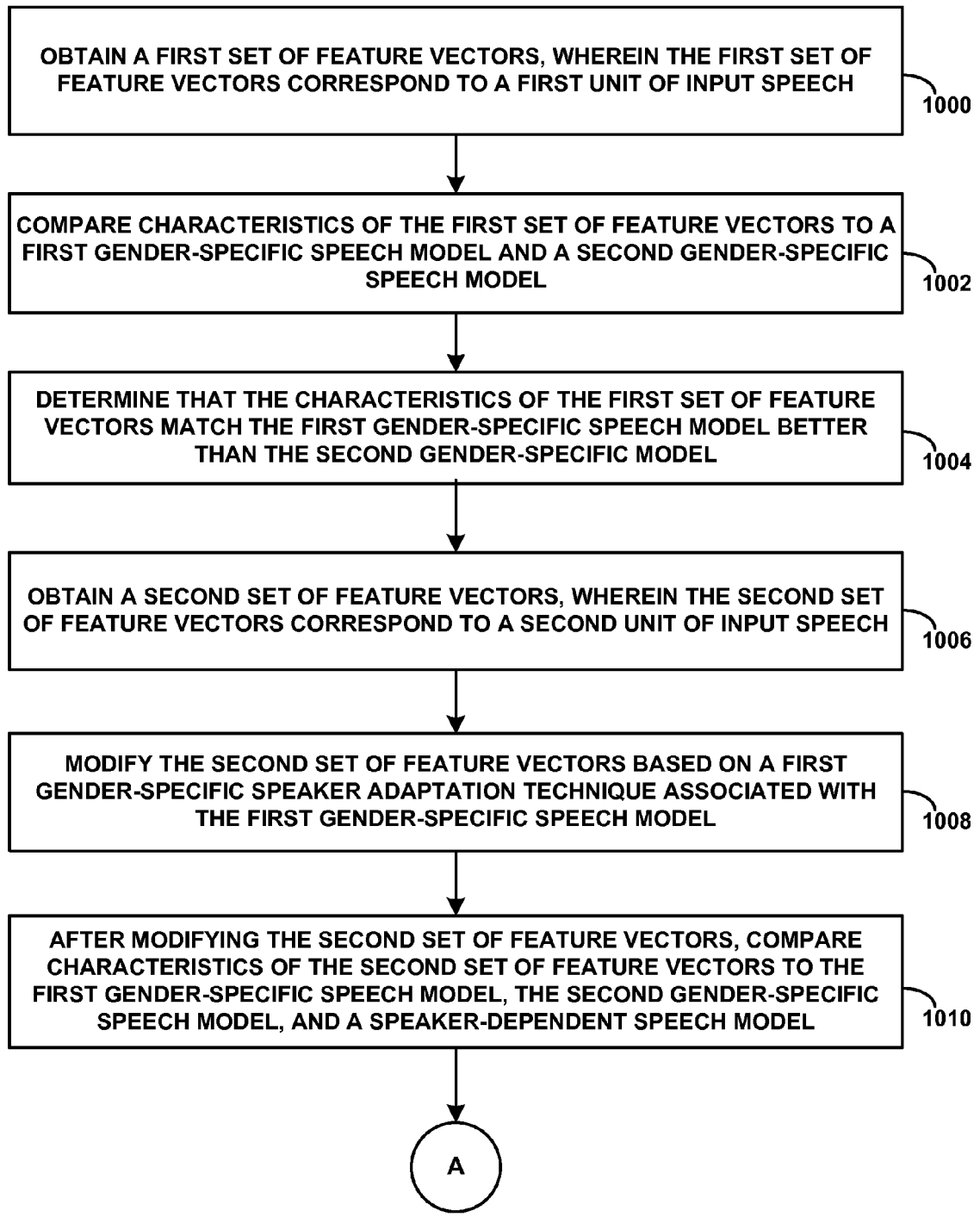
FIGS. 10A and 10B are another flow chart, in accordance with an example embodiment.
Figure 10B:
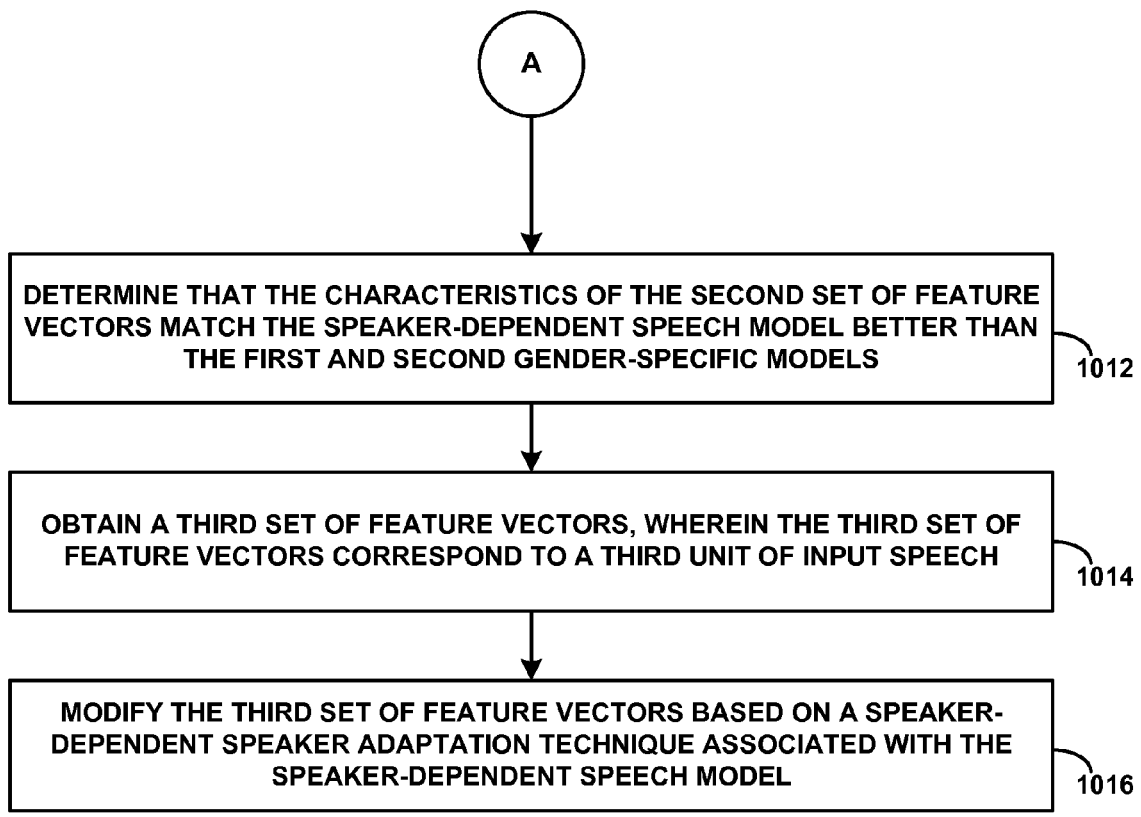

FIGS. 10A and 10B are another flow chart of an example embodiment. Like the example embodiment of FIG. 9, the steps illustrated by this flow chart may be carried out by various computing devices, such as client device 300, server device 200 and/or server cluster 220A, and aspects of some individual steps may be distributed between multiple computing devices.

At step 1000, a first set of feature vectors may be obtained. The first set of feature vectors may correspond to a first unit of input speech. At step 1002, characteristics of the first set of feature vectors may be compared to a first gender-specific speech model and a second gender-specific speech model. One of these speech models may be male-specific and the other may be female-specific, or both may be different speech models for the same gender, but not necessarily adapted to a particular individual.

At step 1004, the characteristics of the first set of feature vectors may be determined to fit the first gender-specific speech model better than the second gender-specific model. At step 1006, a second set of feature vectors may be obtained. The second set of feature vectors may correspond to a second unit of input speech.

At step 1008, the second set of feature vectors may be modified based on a first gender-specific speaker adaptation technique associated with the first gender-specific speech model. Modifying the second set of feature vectors may involve applying a first gender-specific transform to feature vectors in the second set of feature vectors. The first gender-specific transform may be associated with the first gender-specific speaker adaptation technique.

At step 1010, after modifying the second set of feature vectors, characteristics of the second set of feature vectors may be compared to the first gender-specific speech model, the second gender-specific speech model, and at least one speaker-dependent speech model. At step 1012, it may be determined that the characteristics of the second set of feature vectors fit the speaker-dependent speech model better than the first and second gender-specific models. At step 1014, a third set of feature vectors may be obtained. The third set of feature vectors may correspond to a third unit of input speech.

At step 1016 the third set of feature vectors may be modified based on a speaker-dependent speaker adaptation technique associated with the speaker-dependent speech model. Modifying the third set of feature vectors may involve applying a speaker-dependent transform to feature vectors in the third set of feature vectors. The speaker-dependent transform may be associated with the speaker-dependent speaker adaptation technique In some embodiments, after modifying the third set of feature vectors, the characteristics of the third set of feature vectors may be compared to the first gender-specific speech model, the second gender-specific speech model, the speaker-dependent speech model, and at least one environment-specific, speaker-dependent speech model. The speaker-dependent speech model and the environment-specific, speaker-dependent speech model may both be associated with a particular speaker. Possibly as a result of the comparison, it may be determined that the characteristics of the third set of feature vectors fit the environment-specific, speaker-dependent speech model better than the speaker-dependent speech model and both of the first and second gender-specific models.

A fourth set of feature vectors may be obtained, and the fourth set of feature vectors may be modified based on an environment-specific, speaker-dependent speaker adaptation technique associated with the environment-specific, speaker-dependent speech model. The fourth set of feature vectors may correspond to a fourth unit of input speech.

Alternatively or additionally, the first gender-specific speaker adaptation technique may be associated with a particular gender, and the speaker-dependent speaker adaptation technique may be associated with a speaker of the particular gender. Selecting the speaker-dependent speaker adaptation technique may be based on the first gender-specific speaker adaptation technique being associated with a particular gender.

7. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the system that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the system.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable storage media such as computer-readable media that stores data for short periods of time like register memory, processor cache, and/or random access memory (RAM). The computer-readable media may also include non-transitory computer-readable storage media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    obtaining, at a computing device, feature vectors produced at a first time;
    comparing characteristics of the feature vectors produced at the first time to a first gender-specific speech model, a second gender-specific speech model, and a speaker-dependent speech model, wherein the first and second gender-specific speech models are each associated with different genders, and wherein the speaker-dependent speech model is associated with a particular speaker of one of the genders;
    determining that the characteristics of the feature vectors produced at the first time fit the first gender-specific speech model better than the second gender-specific speech model and the speaker-dependent speech model;
    obtaining feature vectors produced at a second time; and
    modifying the feature vectors produced at the second time based on a gender-specific speaker adaptation technique associated with the first gender-specific speech model.

2. The method of claim 1, further comprising:
    obtaining feature vectors produced at a third time;
    comparing characteristics of the feature vectors produced at the third time to the first gender-specific speech model, the second gender-specific speech model, and the speaker-dependent speech model;
    determining that the characteristics of the feature vectors produced at the third time fit the speaker-dependent speech model better than the first and second gender-specific speech models;
    obtaining feature vectors produced at a fourth time; and
    modifying the feature vectors produced at the fourth time based on a speaker-dependent speaker adaptation technique associated with the speaker-dependent speech model.

3. The method of claim 2, wherein modifying the feature vectors produced at the fourth time based on the speaker-dependent speaker adaptation technique associated with the speaker-dependent speech model comprises applying a speaker-dependent transform to the feature vectors produced at the fourth time, wherein the speaker-dependent transform is associated with the speaker-dependent speaker adaptation technique.

4. The method of claim 2, wherein the first gender-specific speaker adaptation technique is associated with a particular gender, wherein the particular speaker is of the particular gender, wherein determining that the characteristics of the feature vectors produced at the third time fit the speaker-dependent speech model better than the first and second gender-specific speech models is based on the first gender-specific speaker adaptation technique being associated with the particular gender and the particular speaker being of the particular gender.

5. The method of claim 2, further comprising:
    obtaining feature vectors produced at a fifth time;
    determining that the feature vectors produced at the fifth time are based on a unit of speech originated proximate to a particular location, and the particular speaker is also associated with an environment-specific, speaker-dependent speaker adaptation technique, wherein the environment-specific, speaker-dependent speaker adaptation technique is associated with the particular location;
    obtaining feature vectors produced at a sixth time; and
    modifying the feature vectors produced at the sixth time based on the environment-specific, speaker-dependent speaker adaptation technique.

6. The method of claim 1, wherein modifying the feature vectors produced at the second time based on the gender-specific speaker adaptation technique associated with the first gender-specific speech model comprises applying a gender-specific transform to the feature vectors produced at the second time, wherein the gender-specific transform is associated with the gender-specific speaker adaptation technique.

7. The method of claim 1, wherein the second time is later than the first time.

8. The method of claim 1, further comprising:
    based on the feature vectors produced at the second time as modified, performing, by an automatic speech recognition system, a transcription of a unit of speech into text, wherein the feature vectors produced at the second time were derived from the unit of speech.

9. An article of manufacture including a computer-readable storage medium, having stored thereon program instructions that, upon execution by a computing device, cause the computing device to perform operations comprising:
    obtaining feature vectors produced at a first time;
    comparing characteristics of the feature vectors produced at the first time to a first gender-specific speech model, a second gender-specific speech model, and a speaker-dependent speech model, wherein the first and second gender-specific speech models are each associated with different genders, and wherein the speaker-dependent speech model is associated with a particular speaker of one of the genders;
    determining that the characteristics of the feature vectors produced at the first time fit the first gender-specific speech model better than the second gender-specific speech model and the speaker-dependent speech model;
    obtaining feature vectors produced at a second time; and
    modifying the feature vectors produced at the second time based on a gender-specific speaker adaptation technique associated with the first gender-specific speech model.

10. The article of manufacture of claim 9, the operations further comprising:
    obtaining feature vectors produced at a third time;
    comparing characteristics of the feature vectors produced at the third time to the first gender-specific speech model, the second gender-specific speech model, and the speaker-dependent speech model;
    determining that the characteristics of the feature vectors produced at the third time fit the speaker-dependent speech model better than the first and second gender-specific speech models;

obtaining feature vectors produced at a fourth time; and modifying the feature vectors produced at the fourth time based on a speaker-dependent speaker adaptation technique associated with the speaker-dependent speech model.

11. The article of manufacture of claim 10, wherein modifying the feature vectors produced at the fourth time based on the speaker-dependent speaker adaptation technique associated with the speaker-dependent speech model comprises applying a speaker-dependent transform to the feature vectors produced at the fourth time, wherein the speaker-dependent transform is associated with the speaker-dependent speaker adaptation technique.

12. The article of manufacture of claim 10, wherein the first gender-specific speaker adaptation technique is associated with a particular gender, wherein the particular speaker is of the particular gender, wherein determining that the characteristics of the feature vectors produced at the third time fit the speaker-dependent speech model better than the first and second gender-specific speech models is based on the first gender-specific speaker adaptation technique being associated with the particular gender and the particular speaker being of the particular gender.

13. The article of manufacture of claim 10, the operations further comprising:

obtaining feature vectors produced at a fifth time;

determining that the feature vectors produced at the fifth time are based on a unit of speech originated proximate to a particular location, and the particular speaker is also associated with an environment-specific, speaker-dependent speaker adaptation technique, wherein the environment-specific, speaker-dependent speaker adaptation technique is associated with the particular location;

obtaining feature vectors produced at a sixth time; and modifying the feature vectors produced at the sixth time based on the environment-specific, speaker-dependent speaker adaptation technique.

14. The article of manufacture of claim 9, wherein modifying the feature vectors produced at the second time based on the gender-specific speaker adaptation technique associated with the first gender-specific speech model comprises applying a gender-specific transform to the feature vectors produced at the second time, wherein the gender-specific transform is associated with the gender-specific speaker adaptation technique.

15. The article of manufacture of claim 9, wherein the second time is later than the first time.

16. The article of manufacture of claim 9, the operations further comprising:

based on the feature vectors produced at the second time as modified, performing, by an automatic speech recognition component of the computing device, a transcription of a unit of speech into text, wherein the feature vectors produced at the second time were derived from the unit of speech.

17. A system comprising:

a feature analysis module, configured to produce feature vectors a first time based on a first unit of speech, and to produce feature vectors at a second time based on a second unit of speech;

a speaker-adaptation module, configured to (i) compare characteristics of the feature vectors produced at the first time to a first gender-specific speech model, a second gender-specific speech model, and a speaker-dependent speech model, wherein the first and second gender-specific speech models are each associated with different genders, and wherein the speaker-dependent speech model is associated with a particular speaker of one of the genders, and (ii) determine that the characteristics of the feature vectors produced at the first time fit the first gender-specific speech model better than the second gender-specific speech model and the speaker-dependent speech model, and (iii) modify the feature vectors produced at the second time based on a gender-specific speaker adaptation technique associated with the first gender-specific speech model; and a pattern classification module, configured to transcribe the second unit of speech into text based on the feature vectors produced at the second time as modified.

18. The system of claim 17, wherein the feature analysis module is further configured to produce feature vectors at a third time based on a third unit of speech, and to produce feature vectors at a fourth time based on a fourth unit of speech, wherein the speaker-adaptation module is further configured to (i) compare characteristics of the feature vectors produced at the third time to the first gender-specific speech model, the second gender-specific speech model, and the speaker-dependent speech model, and (ii) determine that the characteristics of the feature vectors produced at the third time fit the speaker-dependent speech model better than the first and second gender-specific speech models, and (iii) modify the feature vectors produced at the fourth time based on a speaker-dependent speaker adaptation technique associated with the speaker-dependent speech model, and wherein the pattern classification module is further configured to transcribe the fourth unit of speech into text based on the feature vectors produced at the fourth time as modified.

19. The system of claim 18, wherein modifying the feature vectors produced at the fourth time based on the speaker-dependent speaker adaptation technique associated with the speaker-dependent speech model comprises applying a speaker-dependent transform to the feature vectors produced at the fourth time, wherein the speaker-dependent transform is associated with the speaker-dependent speaker adaptation technique.

20. The system of claim 18, wherein the first gender-specific speaker adaptation technique is associated with a particular gender, wherein the particular speaker is of the particular gender, wherein determining that the characteristics of the feature vectors produced at the third time fit the speaker-dependent speech model better than the first and second gender-specific speech models is based on the first gender-specific speaker adaptation technique being associated with the particular gender and the particular speaker being of the particular gender.

* * * * *